US012656229B2

(12) United States Patent
Washizu et al.

(10) Patent No.: US 12,656,229 B2
(45) Date of Patent: Jun. 16, 2026

(54) FIRE DETECTION APPARATUS

(71) Applicant: HOCHIKI Corporation, Tokyo (JP)

(72) Inventors: Keisuke Washizu, Tokyo (JP); Hiroki Masuzawa, Tokyo (JP)

(73) Assignee: Hochiki Corporation, Tokyo (JP)

( * ) Notice: Subject to any disclaimer, the term of this patent is extended or adjusted under 35 U.S.C. 154(b) by 316 days.

(21) Appl. No.: 18/236,567

(22) Filed: Aug. 22, 2023

(65) Prior Publication Data

US 2023/0393034 A1    Dec. 7, 2023

Related U.S. Application Data

(63) Continuation-in-part of application No. PCT/JP2022/005634, filed on Feb. 14, 2022.

(51) Int. Cl.
G01N 1/22 (2006.01)

(52) U.S. Cl.
CPC .................................. G01N 1/2273 (2013.01)

(58) Field of Classification Search
CPC ... G01N 1/2273; G08B 17/107; G08B 17/113
See application file for complete search history.

(56) References Cited

U.S. PATENT DOCUMENTS

| | | | |
|---|---|---|---|
| 5,751,218 A | 5/1998 | Winterble et al. | |
| 2011/0068936 A1* | 3/2011 | Shimada ................ | G08B 17/10 |
| | | | 73/204.22 |

| | | | | |
|---|---|---|---|---|
| 2020/0134999 A1* | 4/2020 | Shimadzu ............ | G08B 17/113 |
| 2020/0319154 A1 | 10/2020 | Dohi | |
| 2021/0041350 A1 | 2/2021 | Takano et al. | |
| 2022/0358820 A1* | 11/2022 | Muro ..................... | G08B 17/10 |

FOREIGN PATENT DOCUMENTS

| | | | |
|---|---|---|---|
| CN | 110675590 A | | 1/2020 |
| JP | 3222743 B2 | | 10/2001 |
| JP | 2009053980 A | * | 3/2009 |
| JP | 4886671 B2 | | 12/2011 |
| JP | 2019046112 A | | 3/2019 |
| JP | 2020013396 A | | 1/2020 |
| JP | 2021174121 A | * | 11/2021 |

OTHER PUBLICATIONS

JP-2009053980-A (Year: 2009).*

(Continued)

*Primary Examiner* — Fatemeh Esfandiari Nia
(74) *Attorney, Agent, or Firm* — Dorsey & Whitney LLP

(57) ABSTRACT

A sensor is a fire detection apparatus attached to a ceiling surface, and includes an inflow space provided inside the sensor, a detection space for detecting a detection target, the detection space being provided at a position on a ceiling surface side of the inflow space on the inside of the sensor, a housing section for housing the detection space, the housing section being capable of allowing the gas containing the detection target to flow into and out of the detection space through the inflow space, and an adjusting portion including a plurality of walls provided in the inflow space, the adjusting portion being used to adjust a flow velocity of the detection target flowing into the detection space.

6 Claims, 17 Drawing Sheets

(56)        References Cited

OTHER PUBLICATIONS

JP-2021174121-A (Year: 2021).*
Extended European Search Report dated Dec. 12, 2024 in connection with European patent application No. 22925976.7, 11 pages.
Partial machine translation of JP3222743B2.
Partial machine translation of JP4886671B2.
Office Action dated Sep. 9, 2025 in connection with Japanese Patent Application No. 2023-526052, 8 pages including English translation.

* cited by examiner

FIRE DETECTION APPARATUS

CROSS REFERENCE TO RELATED APPLICATIONS

The present application claims the benefit of the PCT application No. PCT/JP2022/005634 filed on Feb. 14, 2022, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, a smoke sensor has been proposed to determine the presence or absence of a fire based on smoke density. Such a smoke sensor includes, for example, a detection space for detecting smoke, a smoke detector cover and a circuit board provided to surround the detection space, and an outer cover covering the smoke detector cover and the circuit board. The outer cover includes a main body and a guide portion for guiding an external gas from various directions to the detection space through openings provided in the main body and the smoke detector cover (for example, see Patent Document 1). In this way, an external gas containing smoke can be allowed to flow into the detection space, and the presence or absence of a fire can be determined based on the smoke density.

CITATION LIST

Patent Document

Patent Document 1: Laid-Open Patent Publication in Japan No. 2019-046112

SUMMARY OF THE INVENTION

Technical Problem

Here, in the conventional smoke sensor, as described above, the guide portion guides external gas from various directions into the detection space through the openings provided in the main body and the smoke detector cover. Therefore, for example, when a flow velocity of the gas differs depending on the inflow direction of the external gas, a flow velocity of smoke contained in the external gas flowing into the detection space tends to vary, which may reduce smoke detection accuracy. Therefore, there is room for improvement from a viewpoint of ensuring detection accuracy of a detection target such as smoke.

It is an object of the present invention to solve the problems of the above mentioned prior arts.

Solution to Problem

One aspect of the present invention provides a fire detection apparatus attached to a predetermined installation surface to detect a fire in a monitoring area, the fire detection apparatus comprises: an inflow space provided inside the fire detection apparatus, gas outside the fire detection apparatus being allowed to flow into the inflow space; a detection space for detecting a detection target, the detection space being provided at a position on an installation surface side of the inflow space on the inside of the fire detection apparatus; a housing section for housing the detection space, the housing section being capable of allowing the gas containing the detection target to flow into and out of the detection space through the inflow space; and an adjusting section including a plurality of walls provided in the inflow space, the adjusting section being used to adjust a flow velocity of the detection target flowing into the detection space.

MODE FOR CARRYING OUT THE INVENTION

An embodiment of a fire detection apparatus according to the invention will be described in detail below with reference to the accompanying drawings. However, the invention is not limited by this embodiment.

[Basic Concept of Embodiment]

First, a basic concept of the fire detection apparatus according to this embodiment will be described. The fire detection apparatus is an apparatus attached to a predetermined installation surface, and relates to an apparatus for detecting a fire in a monitoring area.

Here, in the embodiment, the "fire detection apparatus" is an apparatus that detects and reports a fire in the monitoring area based on a detection result of a detection target, and is a concept including, for example, an optical, electrical, and thermal fire sensor or fire alarm, etc.

In addition, the "predetermined installation surface" refers to a surface on which the fire detection apparatus is to be installed among surfaces of an installation object, and is a concept including, for example, a ceiling surface, a wall surface, a floor surface, etc. of a building. However, in the embodiment, a description will be given on the assumption that the predetermined installation surface is a ceiling surface of a room.

In addition, the "monitoring area" is an area to be monitored by the fire detection apparatus, and specifically is a concept indicating an indoor or outdoor area (for example, any space such as a room, a staircase, or a corridor). However, in the embodiment, a description will be given on the assumption that the monitoring area is a room.

[Specific Content of Each Embodiment]

Next, specific content of the embodiment will be described.

(Configuration)

Figure 1:
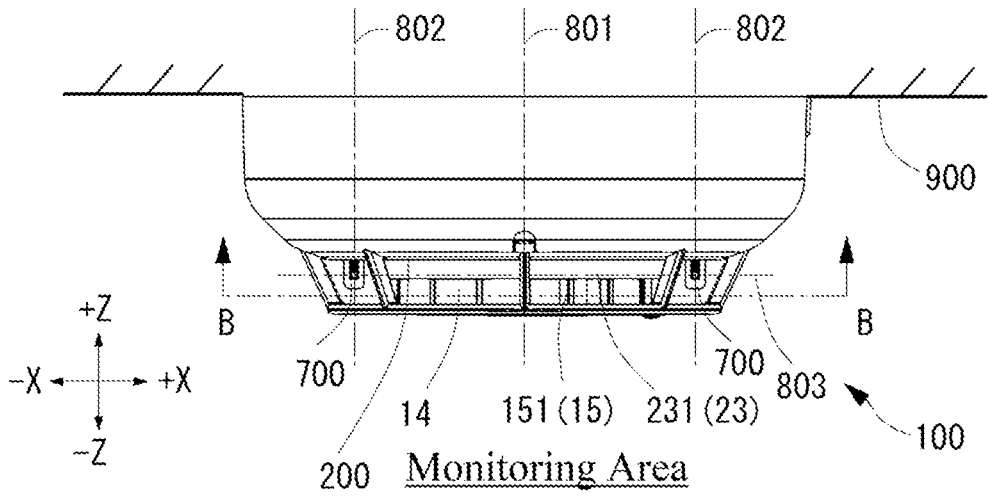
FIG. 1 is a side view of a sensor according to an embodiment of the invention.
Figure 2:
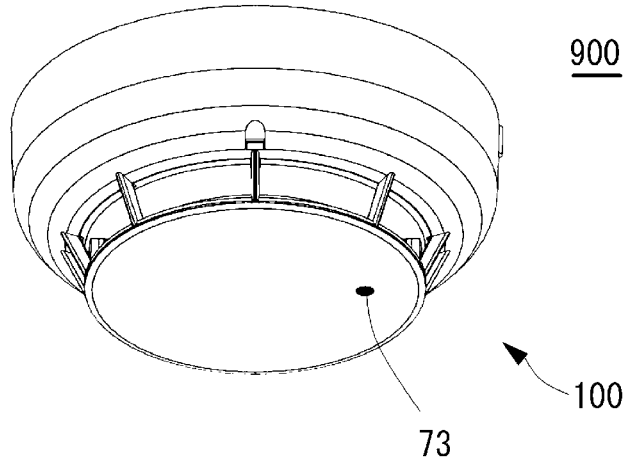
FIG. 2 is a perspective view of the sensor.
Figure 3:
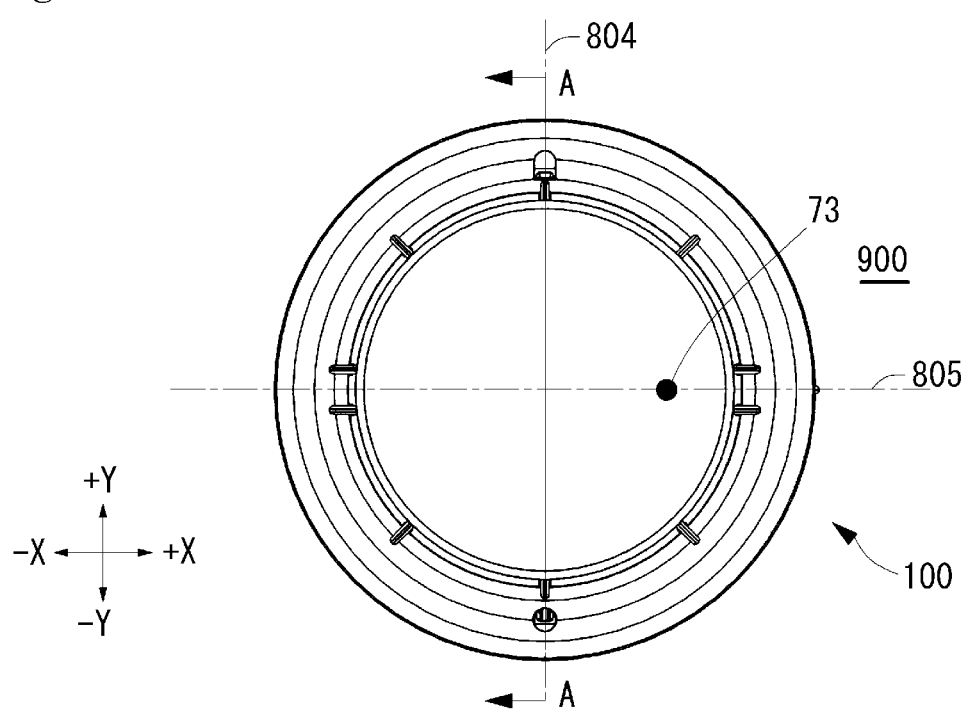
FIG. 3 is a front view of the sensor.
Figure 4:
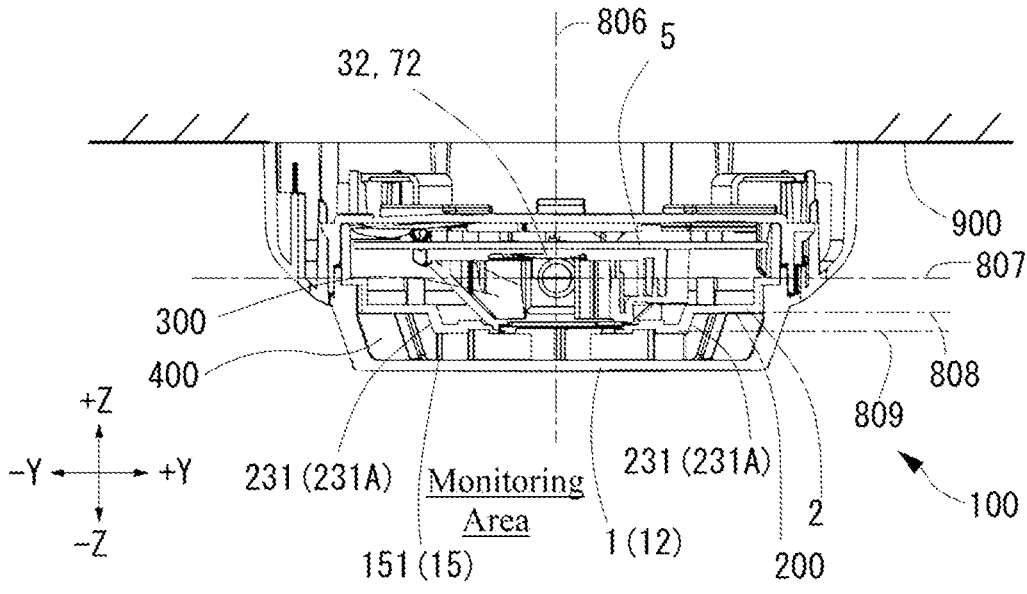
FIG. 4 is a cross-sectional view taken along line A-A of FIG. 3.
Figure 5:
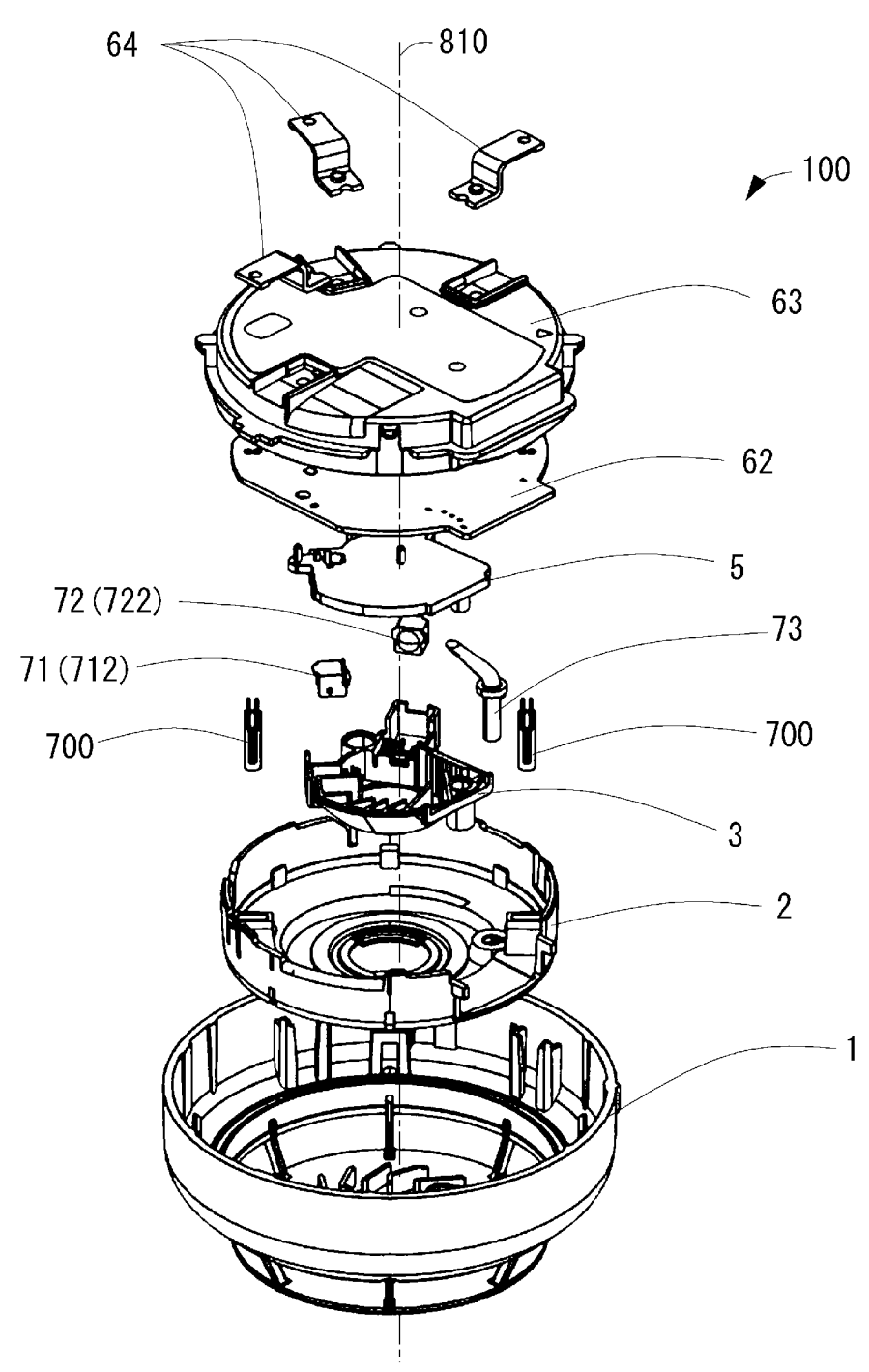
FIG. 5 is an exploded perspective view of the sensor.
Figure 6:
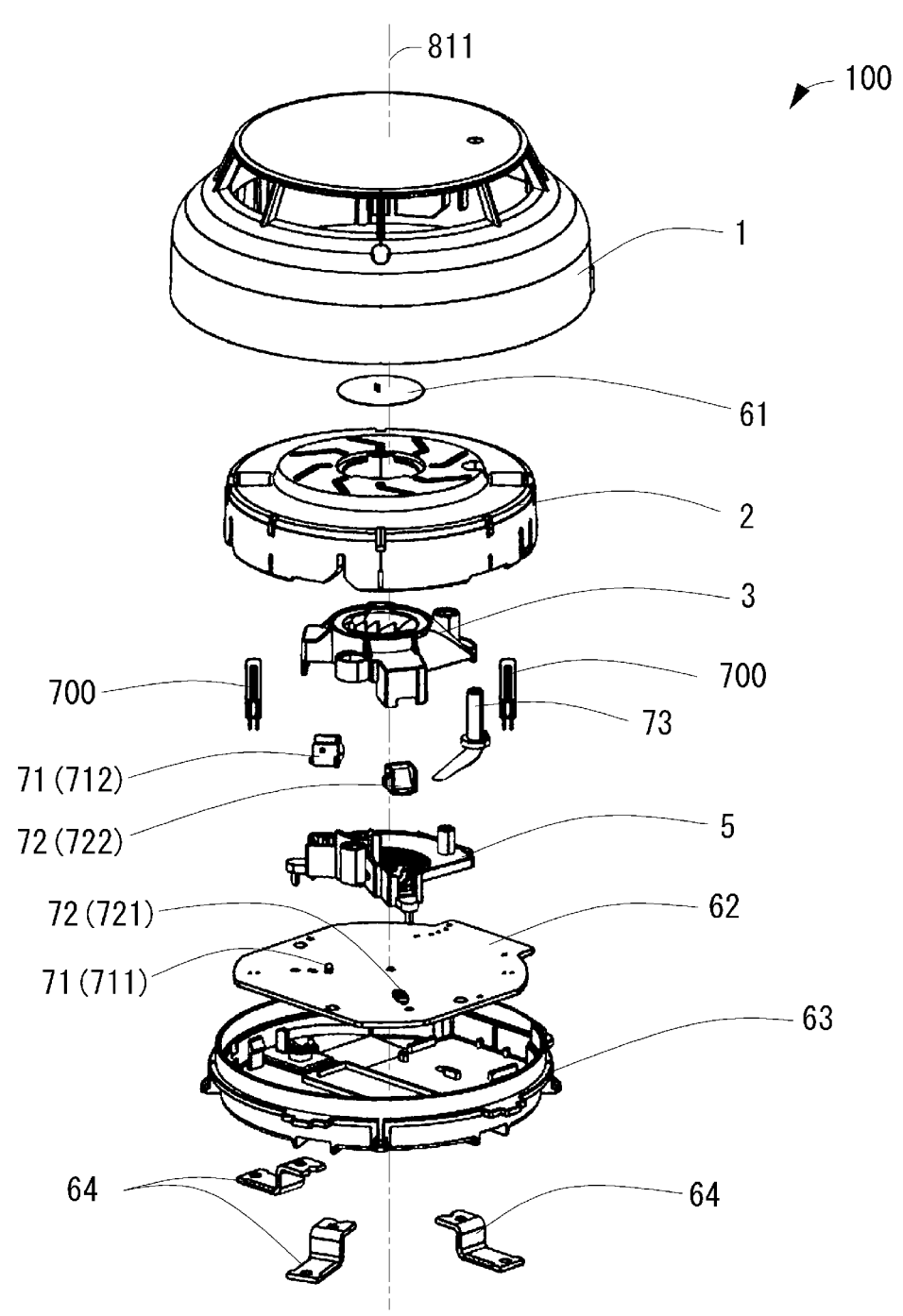
FIG. 6 is an exploded perspective view of the sensor.

First, a configuration of a sensor of the embodiment will be described. FIG. 1 is a side view of the sensor according to the embodiment of the invention, FIG. 2 is a perspective view of the sensor, FIG. 3 is a front view of the sensor, FIG. 4 is a cross-sectional view taken along line A-A of FIG. 3, and FIGS. 5 and 6 are exploded perspective views of the sensor. Note that in each figure, an element related to a feature of the application in a sensor 100 is illustrated and described by attaching a reference symbol thereto, and a similar configuration to that of a conventional sensor may be applied to an element other than the described element. In addition, in FIG. 4, hatching of a cross section is omitted for convenience of description (which is similarly applied to other cross sections).

Note that it is presumed that X-Y-Z axes of each figure are orthogonal to one another, a Z-axis indicates a vertical direction (that is, a longitudinal direction or a thickness direction in an installed state of the sensor 100), a −Z direction is referred to as a front side, and a +Z direction is referred to as a rear side. In addition, the X-axis and the Y-axis indicate a horizontal direction (that is, a transverse direction or a width direction in the installed state of the sensor 100). In addition, in an XY-plane of FIG. 3, a direction away from a center of the sensor 100 is referred to as an outer peripheral side, and a direction approaching the center is referred to as an inner side.

Note that a reference line 801 of FIG. 1 is a center line passing through the center of the sensor 100 and parallel to an upward/downward direction of the drawing, and is illustrated for convenience of description. Note that reference lines of other respective figures are illustrated for convenience of description. A reference line 802 of FIG. 1 is a center line passing through a center of a detection element 700 and parallel to the upward/downward direction of the drawing. A reference line 803 is a line indicating the same height position as a position of a protrusion 23 on a frontmost side (that is, the same height position as a position of a stepped portion 231 on a frontmost side).

A reference line 804 of FIG. 3 is a center line passing through the center of the sensor 100 and parallel to the upward/downward direction of the drawing, and a reference line 805 is a center line passing through the center of the sensor 100 and parallel to the left-right direction of the drawing.

A reference line 806 of FIG. 4 is a center line passing through a center of a light receiving portion 72 and parallel to the upward/downward direction of the drawing, and a reference line 807 is a center line passing through the center of the light receiving portion 72 and parallel to the left-right direction of the drawing. A reference line 808 of FIG. 4 is a line indicating the same height position as that of a base portion 200, and a reference line 809 is a line indicating the same height position as a frontmost position of a protrusion 23 (that is, the same height position as a frontmost position of the stepped portion 231).

Reference lines 810 and 811 of FIGS. 5 and 6 are center lines passing through the center of the sensor 100 and parallel to the upward/downward direction of the drawings.

The sensor 100 is the fire detection apparatus provided in the monitoring area, is, for example, an apparatus for detecting a fire in the monitoring area, and as illustrated in FIG. 1, is installed on a ceiling surface 900 (predetermined installation surface) of the room.

As illustrated in FIGS. 5 and 6, for example, the sensor 100 includes an outer cover 1, an inner cover 2, an inflow space 400, a detection space 300, a smoke detector cover 3, a smoke detector base 5, an insect screen 61 (FIG. 6), a board 62, a terminal board 63, an engaging metal fitting 64, a detection element 700, a light emitting portion 71, a light receiving portion 72, and a light guide 73.

(Configuration—Outer Cover)

Figure 7:
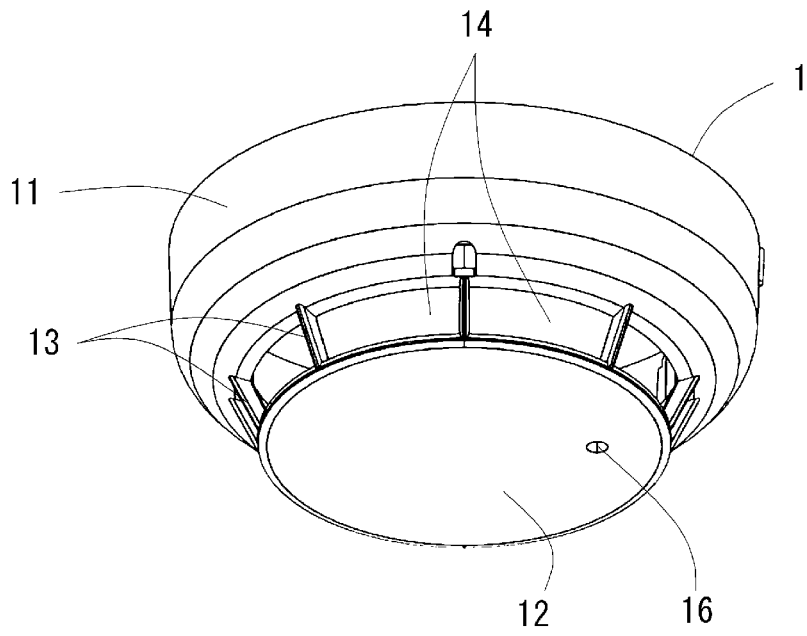
FIG. 7 is a perspective view of an outer cover.
Figure 8:
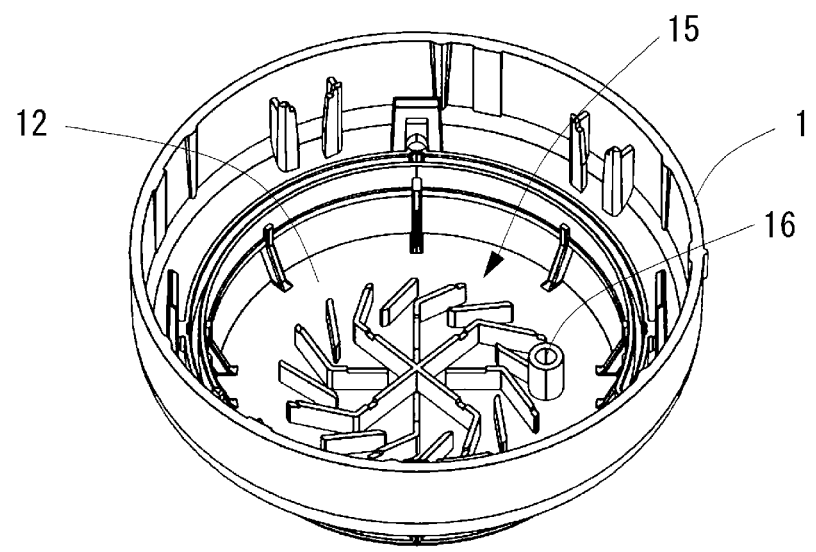
FIG. 8 is a perspective view of the outer cover.
Figure 9:
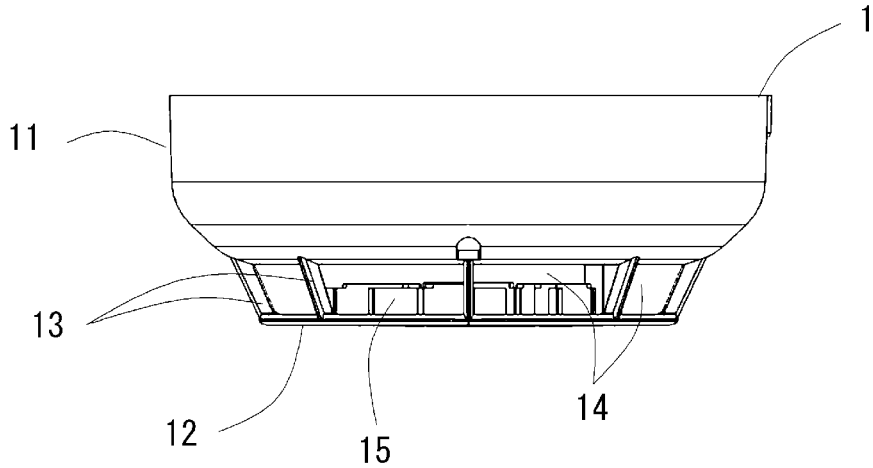
FIG. 9 is a side view of the outer cover.
Figure 10:
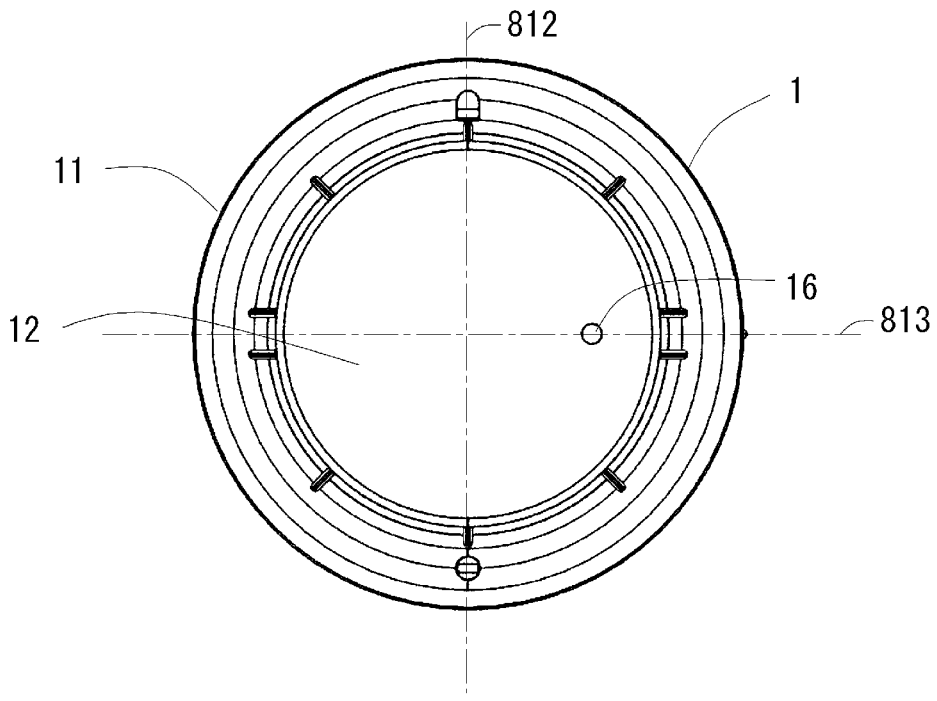
FIG. 10 is a front view of the outer cover.
Figure 11:
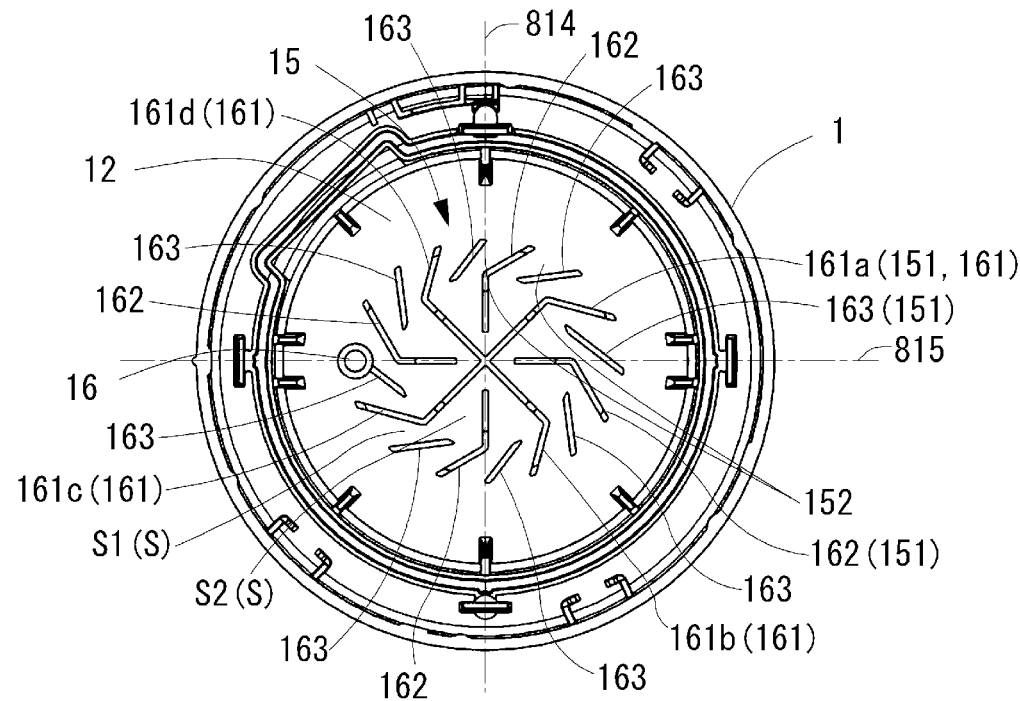
FIG. 11 is a rear view of the outer cover.

FIGS. 7 and 8 are perspective views of the outer cover 1, FIG. 9 is a side view of the outer cover 1, FIG. 10 is a front view of the outer cover 1, and FIG. 11 is a rear view of the outer cover 1. Note that, in each figure, with regard to a plurality of similar components (for example, a connecting portion 13, an inlet 14, etc. of FIG. 9), for convenience of description, only some of the components will be described by attaching reference symbols thereto (which is similarly applied to other elements of other figures).

Note that reference lines 812 and 814 of FIGS. 10 and 11 are center lines passing through a center of the outer cover 1 and parallel to the upward/downward direction of the drawings, and reference lines 813 and 815 of FIGS. 10 and 11 are center lines passing through the center of the outer cover 1 and parallel to the left-right direction of the drawings.

The outer cover 1 is a part of a basic structure of a housing section, and houses the inner cover 2.

Here, the "housing section" houses the detection space 300, can allow gas containing a detection target to flow into and out of the detection space 300 through the inflow space 400, and is described as including the outer cover 1 and the inner cover 2 in the embodiment.

In addition, the "detection target" is a target detected by the sensor 100, specifically is a target generated due to a fire in the monitoring area, and is, for example, a concept including smoke particles, etc. generated due to a fire.

For example, the outer cover 1 is made of resin. For example, the outer cover 1 includes a main body 11, a top surface portion 12, a connecting portion 13, an inlet 14, an adjusting portion 15, and a light guide opening 16 of FIG. 9.

(Configuration—Outer Cover—Main Body)

The main body 11 is a basic structure of the outer cover 1. The main body 11 is formed in a hollow shape, and specifically is formed in a substantially cylindrical shape having a predetermined diameter as illustrated in FIGS. 7 and 8.

(Configuration—Outer Cover—Top Surface Portion)

The top surface portion 12 is a partitioning section for partitioning the inflow space 400. The top surface portion 12 is formed of, for example, a substantially circular plate-shaped body (as an example, a circular plate-shaped body having a diameter smaller than that of an outer circumference of the main body 11, etc.), and is provided substantially horizontally at a position on the opposite side from the ceiling surface 900 side (the front side in FIG. 10) with respect to the main body 11 and the inflow space 400 as illustrated in FIGS. 7, 9, and 10.

(Configuration—Outer Cover—Connecting Portion)

The connecting portion 13 is a portion that connects the main body 11 and the top surface portion 12 to each other, and is, for example, a portion extending between the main body 11 and the top surface portion 12 as illustrated in FIG. 9.

(Configuration—Outer Cover—Inlet)

The inlet 14 is an opening for allowing gas to flow into the sensor 100 and allowing the gas to flow out from the inside of the sensor 100. The inlet 14 is formed in a gap between the main body 11 and the top surface portion 12, and is divided into a plurality of sections by a plurality of connecting portions 13 (that is, a plurality of inlets 14 is provided).

(Configuration—Outer Cover—Adjusting Portion)

The adjusting portion 15 is an adjusting section for adjusting a flow velocity of a detection target flowing into the detection space 300. Note that details of a configuration of the adjusting portion 15 will be described later.

(Configuration—Outer Cover—Light Guide Opening)

The light guide opening 16 is a penetrating opening for exposing a tip of the light guide 73 (FIGS. 5 and 6) to the outside of the sensor 100.

(Configuration—Inner Cover)

Figure 12:
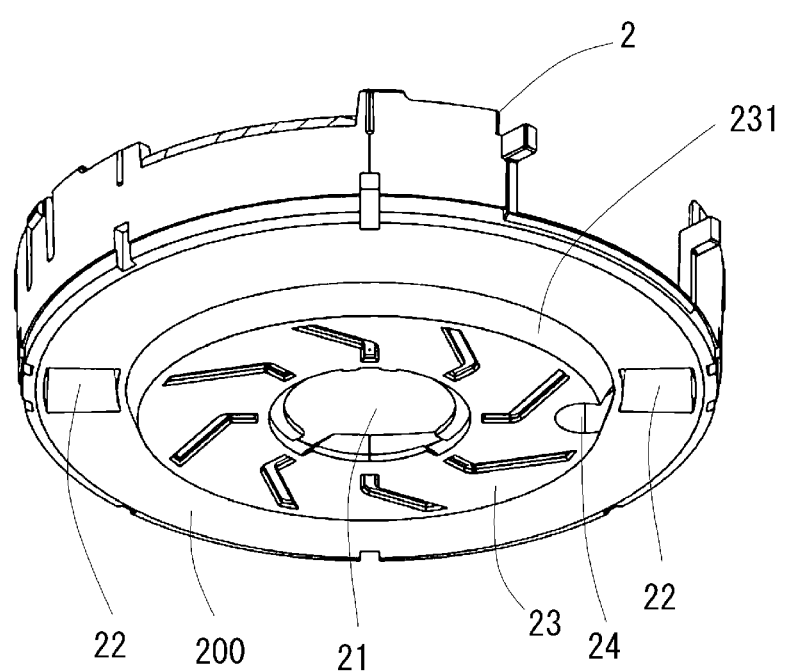
FIG. 12 is a perspective view of an inner cover.
Figure 13:
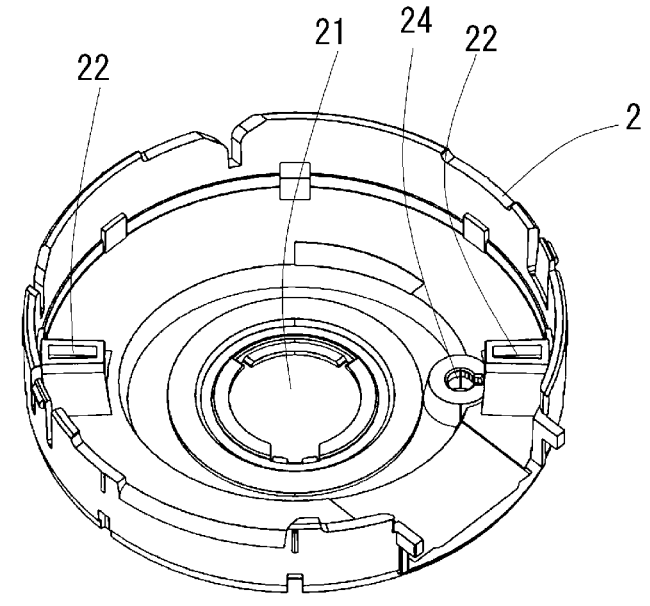
FIG. 13 is a perspective view of the inner cover.
Figure 14:
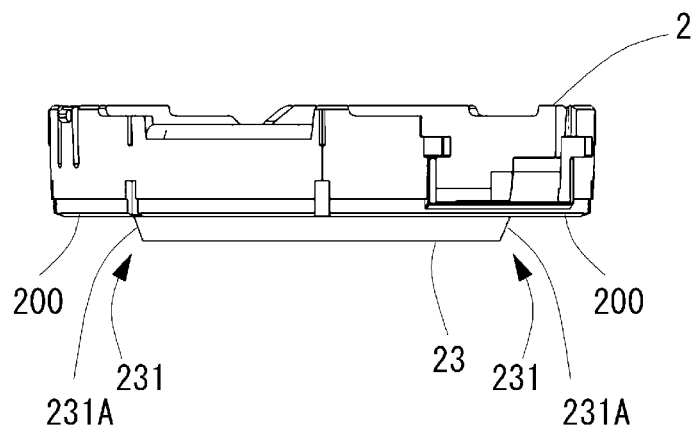
FIG. 14 is a side view of the inner cover.
Figure 15:
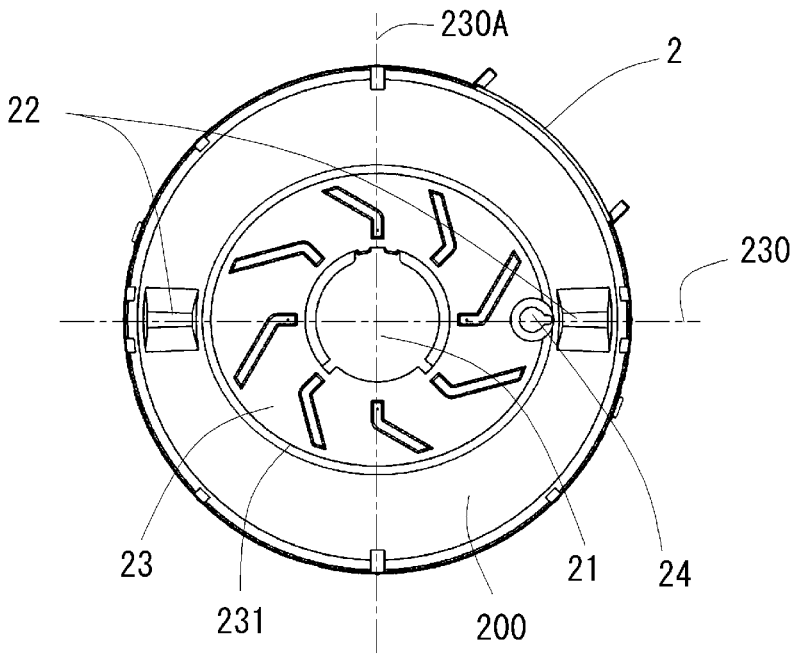
FIG. 15 is a front view of the inner cover.
Figure 16:
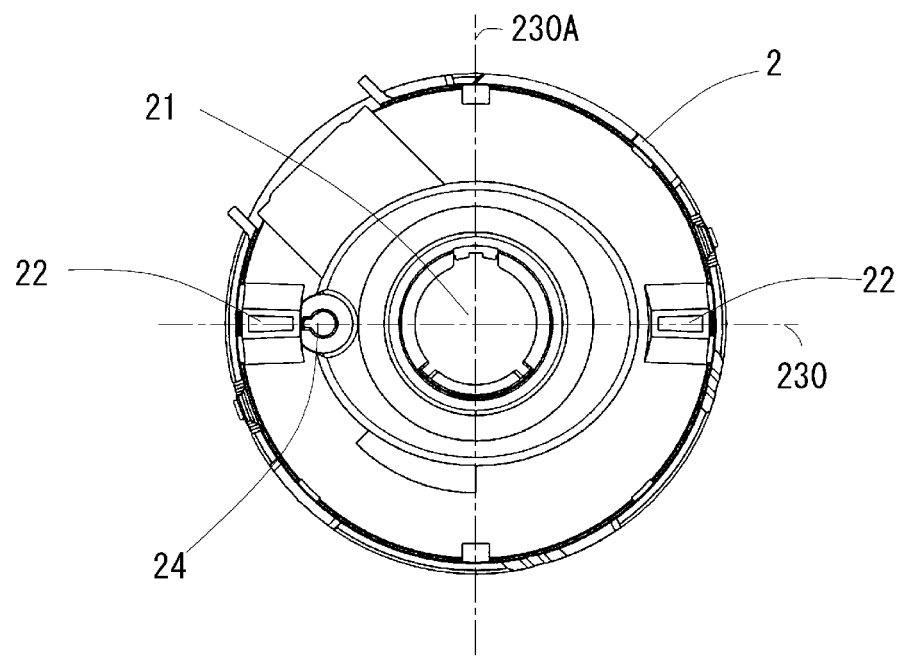
FIG. 16 is a rear view of the inner cover.

FIGS. 12 and 13 are perspective views of the inner cover 2, FIG. 14 is a side view of the inner cover 2, FIG. 15 is a front view of the inner cover 2, and FIG. 16 is a rear view of the inner cover 2.

Note that a major axis 230 of FIGS. 15 and 16 indicates a major axis of an ellipse, which is a peripheral shape of the protrusion 23 (FIG. 15), and indicates a center line passing through a center of the inner cover 2 and parallel to the left-right direction of the drawings. A minor axis 230A of FIGS. 15 and 16 indicates a minor axis of the ellipse, which is the peripheral shape of the protrusion 23 (FIG. 15), and indicates a center line passing through the center of the inner cover 2 and parallel to the upward/downward direction of the drawings.

The inner cover 2 is another part of the basic structure of the housing section, and houses the detection space 300. The inner cover 2 has a circular shape in a front view, and is, for example, made of resin. For example, the inner cover 2 has a first opening 21, a second opening 22, the protrusion 23, and a light guide opening 24 of FIG. 12.

(Configuration—Inner Cover—First Opening)

The first opening 21 is an opening for allowing gas to flow into the detection space 300 and allowing the gas to flow out from the inside of the detection space 300. As illustrated in FIG. 15, for example, the first opening 21 is a circular opening provided at the center of the inner cover 2 in a front view.

(Configuration—Inner Cover—Second Opening)

The second opening 22 is an opening which the detection element 700 is inserted through and is disposed in. As illustrated in FIG. 15, for example, the second opening 22 is a rectangular opening having an elliptical shape in a front view and provided on each of both sides of the protrusion 23 on the major axis 230 of the protrusion 23 (the major axis of the ellipse which is a peripheral shape of the outer peripheral wall 231A in the front view).

(Configuration—Inner Cover—Protrusion)

The protrusion 23 is a portion of the inner cover 2 protruding from the base portion 200 (FIGS. 12, 14, and 15) toward the front side. As illustrated in FIG. 15, for example, the protrusion 23 has an elliptical shape in the front view and has the stepped portion 231.

The stepped portion 231 is a part of the protrusion 23 and is a portion that protrudes and rises with respect to the base portion 200.

(Configuration—Inner Cover—Light Guide Opening)

The light guide opening 24 is an opening which the light guide 73 (FIGS. 5 and 6) is inserted through and is disposed in.

(Configuration—Inflow Space)

The inflow space 400 is a space into which gas outside the sensor 100 can flow. The inflow space 400 is provided inside the sensor 100, and specifically is provided in a space between the top surface portion 12 and the inner cover 2 in an inner space of the outer cover 1 as illustrated in FIG. 4.

(Configuration—Detection Space)

The detection space 300 is a space for detecting the detection target. The detection space 300 is provided at a position on the ceiling surface 900 side of the inflow space 400 in the sensor 100, and specifically is provided in a space surrounded by the smoke detector cover 3 and the smoke detector base 5 in an internal space of the inner cover 2 as illustrated in FIG. 4.

(Configuration—Smoke Detector Cover)

Figure 17:
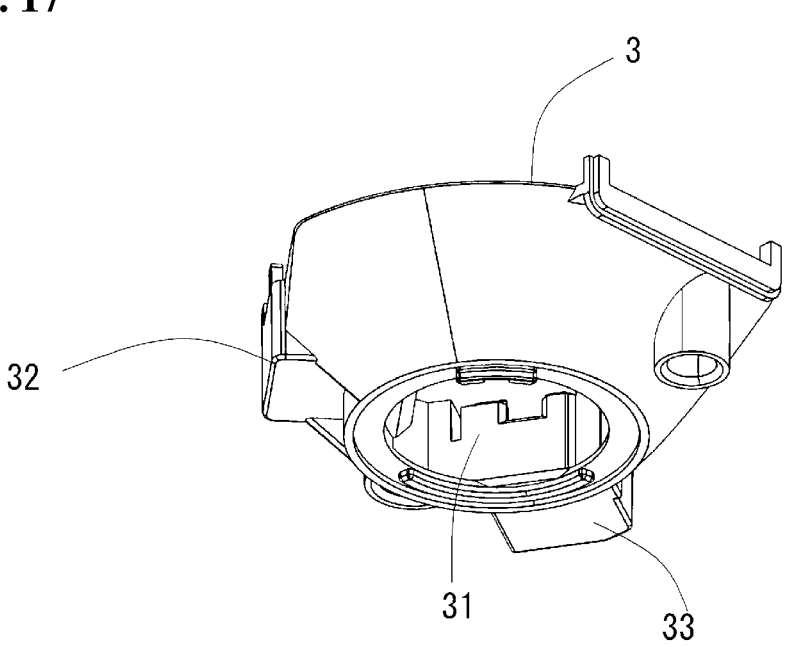
FIG. 17 is a perspective view of a smoke detector cover.
Figure 18:
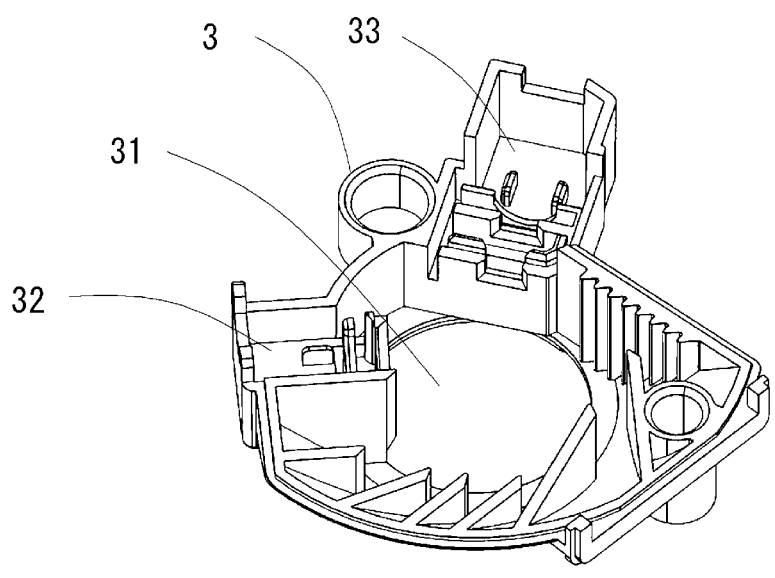
FIG. 18 is a perspective view of the smoke detector cover.
Figure 19:
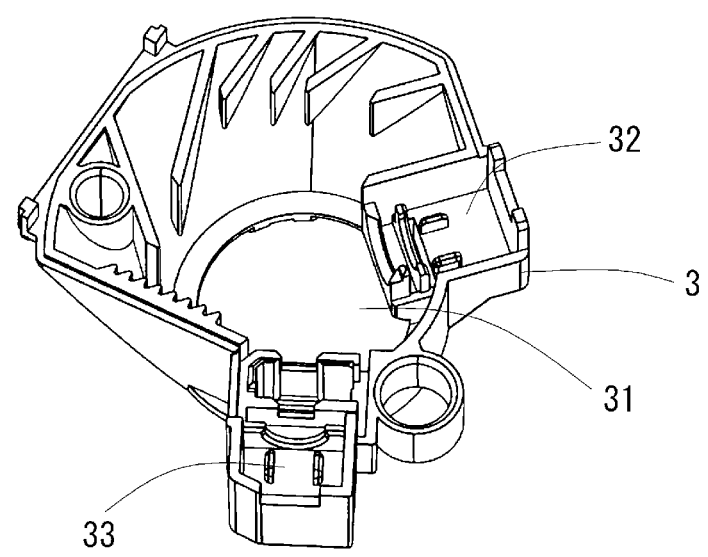
FIG. 19 is a perspective view of the smoke detector cover.
Figure 20:
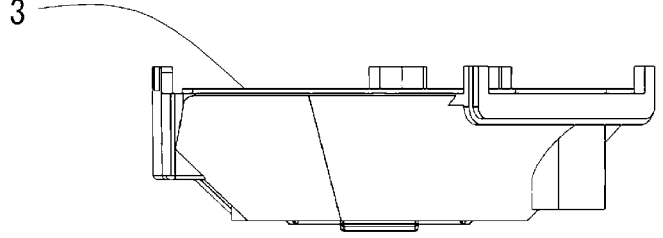
FIG. 20 is a side view of the smoke detector cover.
Figure 21:
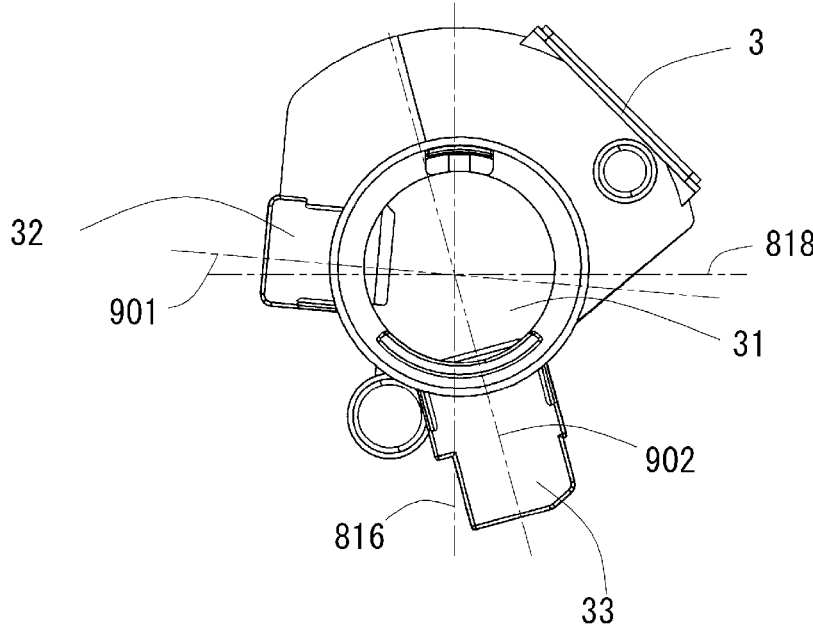
FIG. 21 is a front view of the smoke detector cover.
Figure 22:
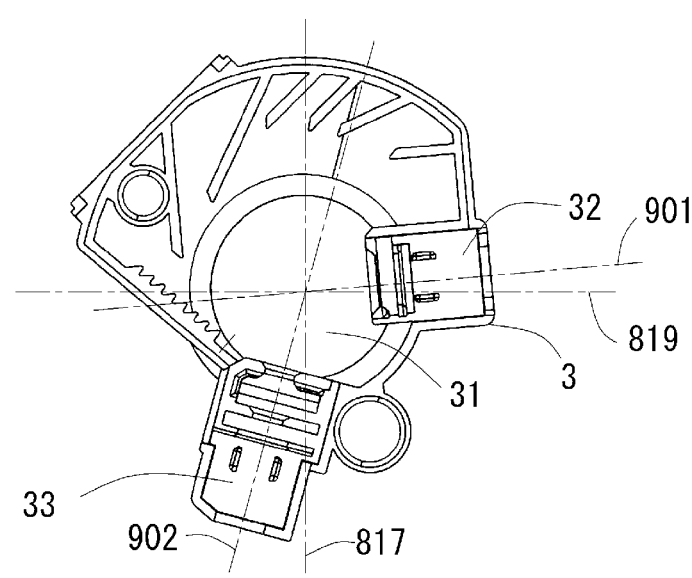
FIG. 22 is a rear view of the smoke detector cover.

FIGS. 17 to 19 are perspective views of the smoke detector cover 3, FIG. 20 is a side view of the smoke detector cover 3, FIG. 21 is a front view of the smoke detector cover 3, and FIG. 22 is a rear view of the smoke detector cover 3.

The smoke detector cover 3 covers the detection space 300 (FIG. 4), a light emitting-side optical element 712 (FIGS. 5 and 6), and a light receiving-side optical element 722 together with the smoke detector base 5, that is, partitions the inside and outside of the detection space 300. For example, the smoke detector cover 3 is made of resin. As illustrated in FIGS. 17 to 19, for example, the smoke detector cover 3 includes an opening 31, a light emitting-side housing 32, and a light receiving-side housing 33.

(Configuration—Smoke Detector Cover—Opening)

The opening 31 is an opening for allowing gas to flow into the detection space 300 and allowing the gas to flow out from the inside of the detection space 300. As illustrated in FIG. 21, for example, the opening 31 is a circular opening and has substantially the same diameter as that of the first opening 21 of the inner cover 2.

(Configuration—Smoke Detector Cover—Each Housing)

The light emitting-side housing 32 is a portion that houses the light emitting-side optical element 712 (FIGS. 5 and 6).

The light receiving-side housing 33 is a portion that houses the light receiving-side optical element 722 (FIGS. 5 and 6).

(Configuration—Smoke Detector Base)

Figure 23:
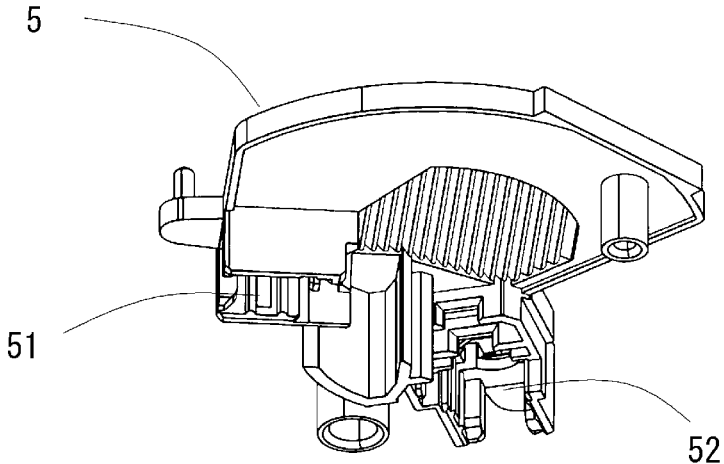
FIG. 23 is a perspective view of a smoke detector base.
Figure 24:
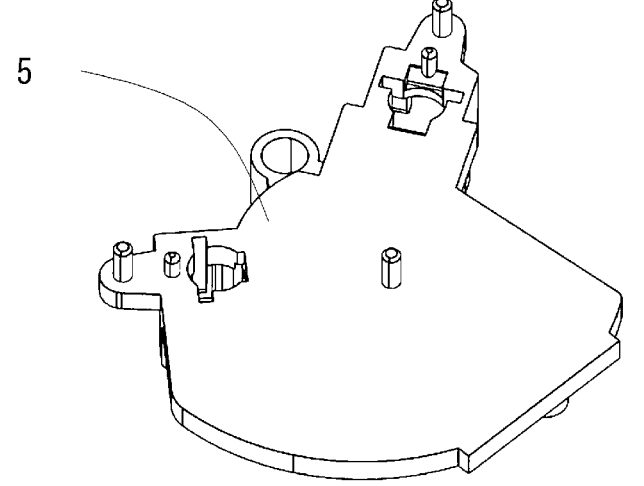
FIG. 24 is a perspective view of the smoke detector base.
Figure 25:
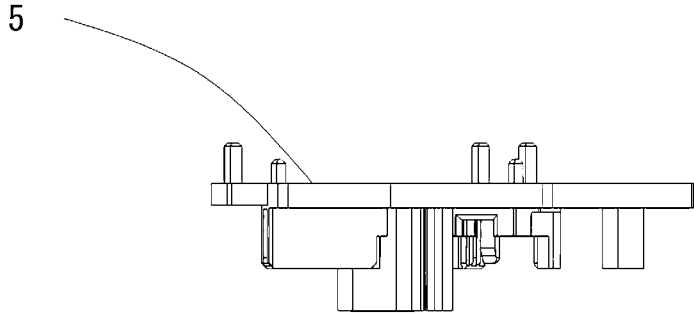
FIG. 25 is a side view of the smoke detector base.
Figure 26:
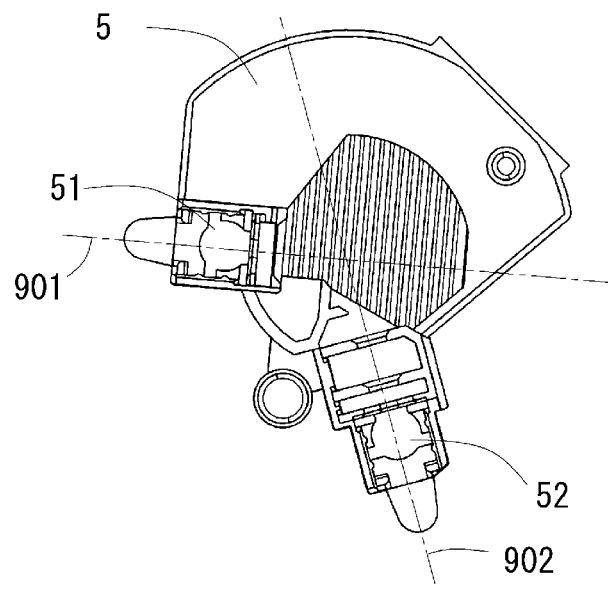
FIG. 26 is a front view of the smoke detector base.
Figure 27:
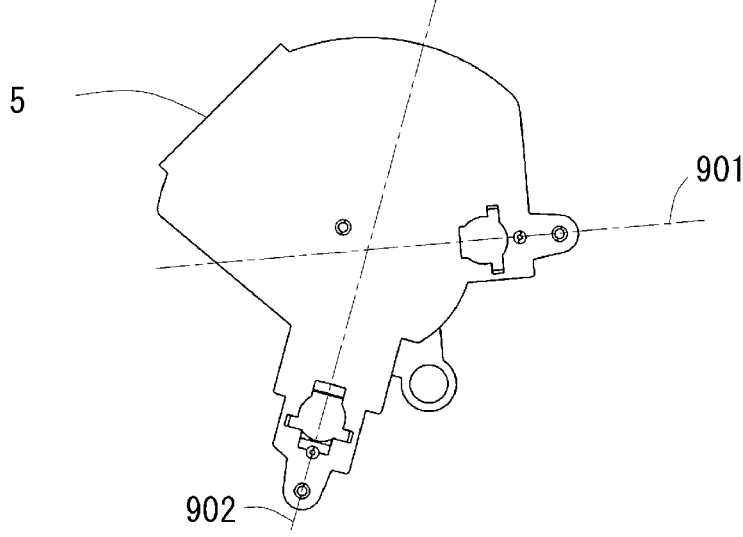
FIG. 27 is a rear view of the smoke detector base.

FIGS. 23 and 24 are perspective views of the smoke detector base 5, FIG. 25 is a side view of the smoke detector base 5, FIG. 26 is a front view of the smoke detector base 5, and FIG. 27 is a rear view of the smoke detector base 5.

Note that a reference line 816 of FIG. 21 is a center line passing through a center of the smoke detector cover 3 and parallel to the upward/downward direction of the drawing, and a reference line 818 is a center line orthogonal thereto.

An optical axis 901 indicates an optical axis of the light emitting portion 71 (FIG. 28) in the sensor 100 in an assembled state. An optical axis 902 indicates an optical axis of the light receiving portion 72 (FIG. 28) in the sensor 100 in the assembled state. A reference line 817 of FIG. 22 is a center line passing through the center of the smoke detector cover 3 and parallel to the upward/downward direction of the drawing, and a reference line 819 is a center line orthogonal thereto.

The smoke detector base 5 covers the detection space 300 (FIG. 4), the light emitting-side optical element 712 (FIGS. 5 and 6), and the light receiving-side optical element 722 together with the smoke detector cover 3, that is, partitions the inside and outside of the detection space 300. For example, the smoke detector base 5 is made of resin. For example, the smoke detector base 5 has a flat plate shape as a whole, and includes a light emitting-side housing 51 (FIGS. 23 and 26) and a light receiving-side housing 52.
(Configuration—Smoke Detector Base—Each Housing)

The light emitting-side housing 51 is a portion for housing the light emitting-side optical element 712 (FIGS. 5 and 6), and is a portion provided at a position corresponding to the light emitting-side housing 32 of the smoke detector cover 3 in the sensor 100 in the assembled state.

The light receiving-side housing 52 is a portion for housing the light receiving-side optical element 722 (FIGS. 5 and 6), and is a portion provided at a position corresponding to the light receiving-side housing 33 of the smoke detector cover 3 in the sensor 100 in the assembled state.
(Configuration—Insect Screen)

The insect screen 61 of FIG. 6 is used to prevent insects from entering the detection space 300 while allowing gas to flow into or out of the detection space 300 (FIG. 4). For example, the insect screen 61 is a circular one provided in the first opening 21 of the inner cover 2, and is provided with a plurality of small holes (not illustrated) having such a predetermined diameter that the small holes allow inflow or outflow of the gas and can prevent entry of insects.
(Configuration—Board)

The board 62 of FIGS. 5 and 6 is a circuit board on which an electric circuit including various elements, an IC, electric wiring, etc. is mounted. As illustrated in FIG. 6, for example, a light emitting element 711 and a light receiving element 721 are mounted on a surface of the board 62 on the front side. Further, the detection element 700 is mounted on the board 62 in addition to each of these elements.
(Configuration—Terminal Board)

The terminal board 63 of FIGS. 5 and 6 covers elements (the smoke detector cover 3, etc.) of the sensor 100 from the rear side. The terminal board 63 is attached to the ceiling surface 900 via the engaging metal fitting 64, that is, is an attachment portion for attaching the sensor 100 to the ceiling surface 900.
(Configuration—Engaging Metal Fitting)

The engaging metal fitting 64 is detachably attached to the terminal board 63 and an attachment structure on the ceiling surface 900 side (for example, a structure fit to or engaged with the engaging metal fitting 64 to fix and attach the engaging metal fitting 64). By using the engaging metal fitting 64, the sensor 100 including the terminal board 63 can be attached to the ceiling surface 900. Note that the engaging metal fitting 64 may be construed as corresponding to the "attachment portion".

In addition, in the embodiment, although not illustrated, it is assumed that the sensor 100 is attached to the ceiling surface 900 using an attachment base that is a circular plate-shaped member having approximately the same diam-eter as that of the terminal board 63. However, when this attachment base is used, the attachment base may be construed as corresponding to the "attachment portion". Note that the "attachment base" is a member provided between the sensor 100 and the ceiling surface 900 to install and attach the sensor 100 on and to the ceiling surface 900, and a detailed description thereof will be omitted since a known configuration can be applied.
(Configuration—Detection Element)

The detection element 700 of FIGS. 5 and 6 is a heat detection element that detects heat of gas flowing into the inflow space 400.

The detection element 700 can be configured using, for example, a thermistor, etc. that detects a temperature corresponding to heat and outputs temperature information indicating the detected temperature. The detection element 700 is mounted on the board 62, and is provided so that a part of the detection element 700 protrudes to the front side of the inner cover 2 while being inserted into the second opening 22 of the inner cover 2 of FIG. 12. Note that the detection element 700 does not have to be mounted, and is used as a sensor for both smoke and heat when mounted, and as a sensor for smoke alone when not mounted.
(Configuration—Light Emitting Portion)

Figure 28:
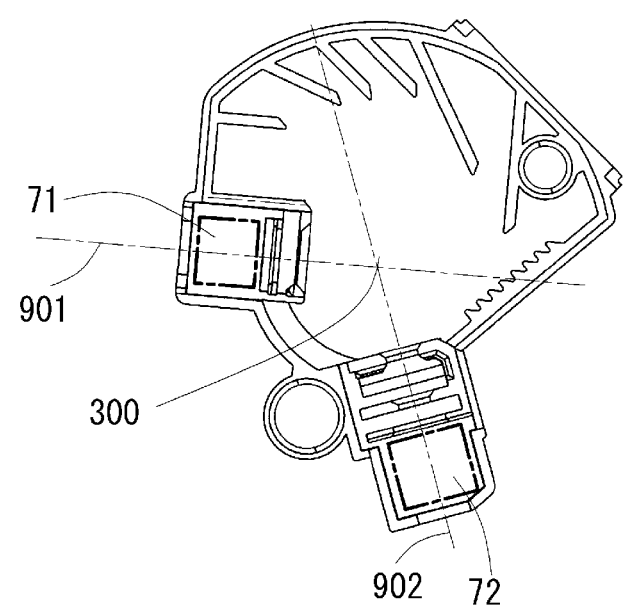
FIG. 28 is a diagram illustrating an inside of a detection space.

FIG. 28 is a diagram illustrating the inside of the detection space 300. Note that FIG. 28 illustrates a state in which the inside of the smoke detector cover 3 is viewed from the front side in the sensor 100 in the assembled state, and illustration of a detailed structure of the smoke detector base 5 is omitted for convenience of description.

The light emitting portion 71 of FIG. 28 is a light emitting section that emits emission light for detecting smoke particles, which are detection targets, into the detection space 300. As illustrated in FIGS. 5 and 6, for example, the light emitting portion 71 includes the light emitting element 711 and the light emitting-side optical element 712.
(Configuration—Light Emitting Portion—Light Emitting Element)

The light emitting element 711 is an element that emits light (emission light), and may be configured using, for example, a light emitting diode (LED). The light emitting element 711 is mounted on the board 62.
(Configuration—Light Emitting Portion—Light Emitting-Side Optical Element)

The light emitting-side optical element 712 is an element that guides and emits emission light emitted by the light emitting element 711 into the detection space 300, and may be configured using, for example, a prism. For example, the light emitting-side optical element 712 is housed in the smoke detector cover 3 and the smoke detector base 5.

For example, the light emitting-side optical element 712 is configured to emit light from the light emitting element 711 mainly in a direction parallel to the smoke detector base 5 (that is, a direction parallel to the XY-plane of FIG. 3).
(Configuration—Light Receiving Portion)

The light receiving portion 72 of FIG. 28 is a light receiving section that receives scattered light, etc. generated by emission light scattered by the smoke particles, which are detection targets in the detection space 300. As illustrated in FIGS. 5 and 6, for example, the light receiving portion 72 includes the light receiving element 721 and the light receiving-side optical element 722.
(Configuration—Light Receiving Portion—Light Receiving Element)

The light receiving element 721 is an element that receives light (scattered light, etc.), and may be configured using, for example, a photodiode. The light receiving element 721 is mounted on the board 62.

(Configuration—Light Receiving Portion—Light Receiving-Side Optical Element)

The light receiving-side optical element 722 is an element that guides light in the detection space 300 to the light receiving element 721, and may be configured using, for example, a prism. The light receiving-side optical element 722 is housed in the smoke detector cover 3 and the smoke detector base 5.

The light receiving-side optical element 722 is configured to guide scattered light, etc. scattered by the smoke particles and entering the light receiving-side optical element 722 to the light receiving element 721.

(Configuration—Light Guide)

The light guide 73 of FIGS. 5 and 6 is an element that functions as an indicator light of the sensor 100, and as illustrated in FIGS. 2 and 3, for example, a part thereof is exposed on the front side of the sensor 100. For example, on the assumption that a light emitting element (LED) different from the light emitting-side optical element 712 is provided on the surface of the board 62 on the front side, the light guide 73 is an element that guides light from this light emitting element and outputs the light to the front side of the sensor 100. The "indicator light" is an element that displays a state of the sensor 100. For example, the indicator light outputs light of a color (for example, green or red) according to the state of the sensor 100 to display the state of the sensor 100.

(Configuration—Others—Gas Sensor)

In addition to the above configuration, a gas sensor (for example, a CO gas sensor) that detects fire gas may be mounted.

(Configuration—Details of Configuration of Adjusting Portion)

Figure 29:
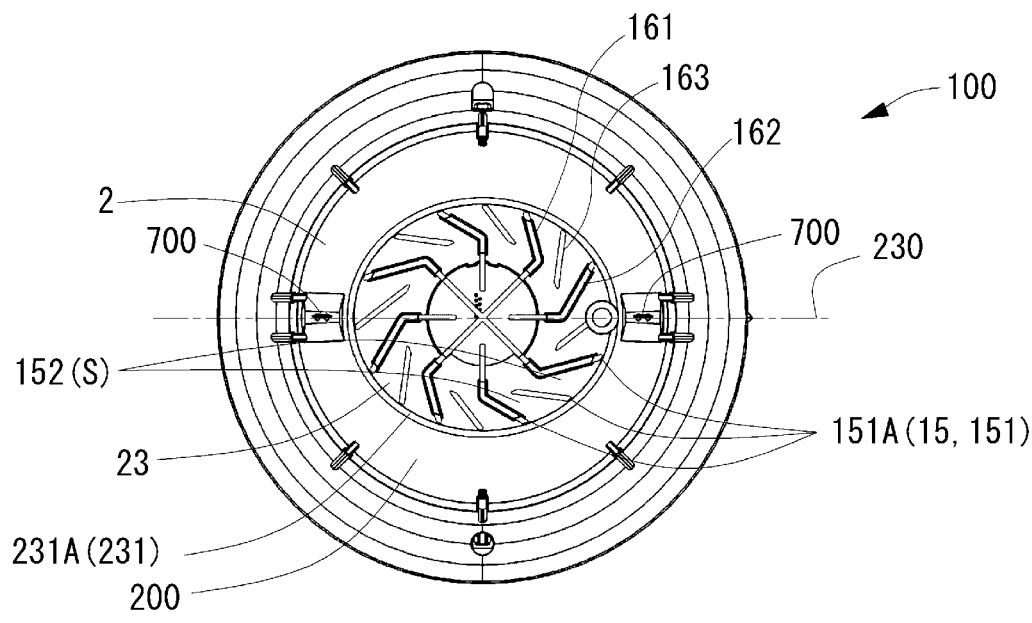
FIG. 29 is a cross-sectional view taken along line B-B of FIG. 1.

Next, details of a configuration of the adjusting portion 15 will be described. FIG. 29 is a cross-sectional view taken along line B-B of FIG. 1.

Features of the adjusting portion 15 are as follows in the embodiment. However, the adjusting portion 15 may be manufactured in any shape, using any method, and using any material, unless otherwise specified.

(Configuration—Details of Configuration of Adjusting Portion—First Feature)

With regard to a first feature of the configuration of the adjusting portion 15, the adjusting portion 15 includes a plurality of walls 151 provided in the inflow space 400. In addition, as illustrated in FIGS. 1, 4, 8, 11, and 29, the plurality of walls 151 is provided to partition the inflow space 400, and includes a first wall 161, a second wall 162, and a third wall 163.

(Configuration—Details of Configuration of Adjusting Portion—First Feature—First Wall)

The first wall 161 is an intersection wall in which four walls 161a to 161d (hereinafter referred to as "first intersection wall 161a", "second intersection wall 161b", "third intersection wall 161c", and "fourth intersection wall 161d") intersect in a substantially cross shape, and is provided at least in a central portion of the inflow space 400.

Specifically, as illustrated in FIGS. 11 and 29, the first wall 161 is configured so that respective inner end portions of the first intersection wall 161a, the second intersection wall 161b, the third intersection wall 161c, and the fourth intersection wall 161d intersect each other, and respective outer end portions of the first intersection wall 161a, the second intersection wall 161b, the third intersection wall 161c, and the fourth intersection wall 161d are located at an outer edge of the stepped portion 231 or in the vicinity thereof. In addition, the first wall 161 is disposed so that respective side end portions 151A of the first intersection wall 161a, the second intersection wall 161b, the third intersection wall 161c, and the fourth intersection wall 161d is disposed along an outer periphery of the stepped portion 231 on the front side of the stepped portion 231.

In addition, a specific configuration of the first wall 161 is any configuration. However, in the embodiment, as illustrated in FIG. 11, each of the first intersection wall 161a, the second intersection wall 161b, the third intersection wall 161c, and the fourth intersection wall 161d is formed to have a substantially curved shape in a front view. In this way, gas flowing into the inflow space 400 is easily suppressed from flowing into the detection space 300 through the first opening 21 without coming into contact with the first intersection wall 161a, the second intersection wall 161b, the third intersection wall 161c, or the fourth intersection wall 161d.

With such a first wall 161, it is possible to ensure a flow path for allowing the detection target to flow into the detection space 300 from the outside of the sensor 100 in the inflow space 400, and to enhance stability when the adjusting portion 15 is attached. In addition, it is possible to suppress permeation of moisture (for example, steam, etc.) in the central portion of the inflow space 400, and to enhance a moisture permeation prevention property.

(Configuration—Details of Configuration of Adjusting Portion—First Feature—Second Wall)

The second wall 162 is a wall provided between intersection walls of the first wall 161, and a plurality of second walls 162 is provided in the inflow space 400.

Specifically, as illustrated in FIGS. 11 and 29, one second wall 162 is provided in each of four spaces partitioned by adjacent intersection walls (that is, four second walls 162 are provided) in the inflow space 400. In addition, each second wall 162 is disposed so that a side end portion 151A of the second wall 162 extends along the outer periphery of the stepped portion 231 on the front side of the stepped portion 231.

In addition, a specific configuration of the second wall 162 is any configuration. However, in the embodiment, as illustrated in FIG. 11, the second wall 162 is formed to have a substantially curved shape in a front view. In this way, gas flowing into the inflow space 400 is easily suppressed from flowing into the detection space 300 through the first opening 21 without coming into contact with the second wall 162.

(Configuration—Details of Configuration of Adjusting Portion—First Feature—Third Wall)

The third wall 163 is a wall provided between an intersection wall of the first wall 161 and the second wall 162, and a plurality of third walls 163 is provided in the inflow space 400.

Specifically, as illustrated in FIGS. 11 and 29, one third wall 163 is provided in each of eight spaces partitioned by one of the first intersection wall 161a, the second intersection wall 161b, the third intersection wall 161c, or the fourth intersection wall 161d and the second wall 162 (that is, eight third walls 163 are provided) in the inflow space 400. In addition, each third wall 163 is disposed so that a side end portion 151A of the third wall 163 extends along the outer periphery of the stepped portion 231 on the front side of the stepped portion 231.

In addition, a specific configuration of the third wall 163 is any configuration. However, in the embodiment, as illustrated in FIG. 11, the third wall 163 is formed to have a substantially linear shape in a front view. However, the invention is not limited thereto, for example, the third wall 163 may be formed in a shape other than the substantially linear shape (for example, a substantially curved shape, etc.) in the front view.

(Configuration—Details of Configuration of Adjusting Portion—First Feature—Other Configurations)

In addition, an installation method of a plurality of walls 151 (specifically, the first wall 161, the second wall 162, and the third wall 163) is any method. However, in the embodiment, the plurality of walls 151 is disposed to mutually have an interval therebetween so that a space (specifically, a space S described later) partitioned by the plurality of walls 151 in the inflow space 400 has a labyrinth shape. In addition, at least some of the plurality of walls 151 are disposed in a radial shape from the central portion of the inflow space 400 toward the outside.

Here, the "labyrinth shape" means a shape in which the outer end portion to the inner end portion of the space partitioned by the plurality of walls 151 cannot be connected by a straight line.

Specifically, as illustrated in FIGS. 11 and 29, the first wall 161 is disposed so that each intersection wall has a radial shape by disposing an intersection of each intersection wall in the central portion of the inflow space 400. In addition, each second wall 162 is disposed to mutually have an interval between each second wall 162 and the first wall 161 and is disposed in a radial shape from the central portion of the inflow space 400 toward the outside. In addition, each third wall 163 is disposed between an outer portion of each intersection wall of the first wall 161 and an outer portion of the second wall 162, and is disposed at an inclination different from an inclination of the outer portion of each intersection wall and an inclination of the outer portion of the second wall 162 in a front view (that is, is disposed in a non-radial shape from the central portion of the inflow space 400 toward the outside).

By such installation, the space S of FIG. 11 obtained by combining a space S1 of FIG. 11 partitioned by each intersection wall of the first wall 161 or an outer portion of any one of the second walls 162 and the third wall 163 and a space S2 of FIG. 11 partitioned by each intersection wall of the first wall 161 or an inner portion of any one of the second walls 162 and each intersection wall of the first wall 161 or an inner portion of another one of the second walls 162 in the inflow space 400 can be formed in a labyrinth shape, and a flow velocity of the detection target flowing into the inflow space 400 can be effectively adjusted. In addition, since a plurality of spaces S can be formed in a radial shape, even when the detection target flows into the inflow space 400 from various directions, the flow velocity of the detection target can be effectively adjusted.

In addition, a method of forming the plurality of walls 151 (adjusting portions is any method. However, in the embodiment, the plurality of walls 151 is formed integrally with the outer cover 1 or the inner cover 2.

Here, for example, "formed integrally" is a concept including that the adjusting portion 15 and the outer cover 1 (or the inner cover 2) are formed of one member, and that the adjusting portion 15 and the outer cover 1 (or the inner cover 2) are configured so that mutual heat transfer is allowed to an extent comparable to the case where the adjusting portion 15 and the outer cover 1 (or the inner cover 2) are formed of one member by bringing the adjusting portion 15 and the outer cover 1 (or the inner cover 2) into close contact with each other (for example, the adjusting portion 15 is formed separately from the outer cover 1 and then fixed thereto using an adhesive, etc.). In the embodiment, a description will be given on the assumption that the adjusting portion and the outer cover 1 (or the inner cover 2) are formed of one member using the same resin material.

Specifically, as illustrated in FIG. 11, the plurality of walls 151 is formed integrally with the top surface portion 12 of the outer cover 1, and the plurality of walls 151 is provided to protrude from the top surface portion 12 toward the rear side (more specifically, the plurality of walls 151 is erected and disposed to come into contact with the protrusion 23).

With such formation, when compared to the case where the plurality of walls 151 is formed separately from the outer cover 1 or the inner cover 2, it is possible to omit the trouble of attaching the plurality of walls 151 to the outer cover 1 or the inner cover 2, and to enhance an attaching property of the adjusting portion 15. In addition, since the heat capacity of the adjusting portion 15 can be increased, it is possible to improve the moisture permeation prevention property.

According to the first feature described above, even when the flow velocity of the gas varies depending on the direction of the inflow of the gas into the inflow space 400, a flow velocity of the detection target contained in the gas can be adjusted to a desired velocity. Therefore, it is possible to avoid variation in the flow velocity of the detection target flowing into the detection space 300, and it becomes easy to ensure the detection accuracy of the detection target.

(Configuration—Details of Configuration of Adjusting Portion—Second Feature)

With regard to a second feature of the configuration of the adjusting portion 15, the plurality of inlets 14 and the plurality of walls 151 are configured so that a relative arrangement relationship between an inlet 14 and a wall 151 corresponding to the inlet 14 is the same for the plurality of inlets 14.

Specifically, the plurality of walls 151 is disposed so that the installation number of walls 151 installed to correspond to each inlet 14 is the same. More specifically, the plurality of walls 151 is disposed so that three walls 151 are seen when the inside of each inlet 14 is viewed from the outside of the sensor 100.

In this case, a method of setting the installation number of walls 151 is any method. However, in the embodiment, from a viewpoint of facilitating uniform gas inflow at each inlet 14, the installation number of walls 151 is set to be an integral multiple of the installation number of inlets 14. Specifically, when the installation number of inlets 14 is eight, the installation number of walls 151 is set to 16.

In addition, a method of setting sizes of the walls 151 and the inlets 14 is any method. However, in the embodiment, from a viewpoint of facilitating uniform gas inflow at each inlet 14, a length of a gap between adjacent walls 151 among the plurality of walls 151 (specifically, a length of the gap in a horizontal direction) is set to be substantially uniform, and a length of a width of each of the plurality of inlets 14 (specifically, a length of the inlet 14 in the horizontal direction (direction along the ceiling surface 900)) is set to be substantially uniform. Specifically, the length (maximum length) of the gap between the adjacent walls 151 is set to approximately ⅓ the length of the width of each of the plurality of inlets 14.

According to the second feature, the inflow of gas at each inlet 14 can be made uniform. Therefore, it is possible to suppress variation in the amount of gas flowing into each inlet 14, and it becomes easier to ensure detection accuracy of the detection target.

(Assembly Procedure for Sensor)

Next, a procedure for assembling the sensor 100 will be described. Here, an example of the procedure for assembling the sensor 100 will be described mainly with reference to FIGS. 5 and 6.

First, the light emitting-side optical element 712 and the light receiving-side optical element 722 are housed in the light emitting-side housing 51 (FIGS. 23 and 26) and the light receiving-side housing 52 of the smoke detector base 5.

Next, the smoke detector cover 3 is attached to the smoke detector base 5 using any method (for example, a method using an engagement structure provided in each element, etc.). In this case, the light emitting-side optical element 712 and the light receiving-side optical element 722 are also housed in the light emitting-side housing 32 (FIG. 19) and the light receiving-side housing 33 of the smoke detector cover 3.

Next, the board 62 on which the light emitting element 711, the light receiving element 721, and the detection element 700 are mounted is attached to the terminal board 63 from the front side of the terminal board 63 (the upper side of the drawing of FIG. 6) using any method (for example, a screwing method, etc.). In addition, the engaging metal fitting 64 is attached to the terminal board 63 from the rear side of the terminal board 63 (the lower side of the drawing of FIG. 6) using any method (for example, a screwing method, etc.).

Next, the smoke detector base 5 with the smoke detector cover 3 attached thereto is attached to the board 62 from the front side of the board 62 (the upper side of the drawing of FIG. 6) using any method (for example, a method of using an engagement structure provided in each element, a screwing method, etc.).

Next, the inner cover 2 is attached to the terminal board 63 from the front side of the terminal board 63 (the upper side of the drawing of FIG. 6) to which the smoke detector cover 3, etc. is attached using any method (for example, a method of using an engagement structure provided in each element, etc.). Note that, in this case, a part of the detection element 700 is inserted through the second opening 22 of the inner cover 2 and protrudes from the inner cover 2 toward the front side. In addition, the light guide 73 is inserted through the light guide opening 24 of the inner cover 2.

Next, the insect screen 61 is provided in the first opening 21 of the inner cover 2.

Next, the outer cover 1 is attached to the terminal board 63 from the front side (the upper side of the drawing of FIG. 6) of the terminal board 63 to which the inner cover 2, etc. is attached using any method (for example, a method using an engagement structure provided in each element, etc.). Note that, in this case, as illustrated in FIG. 1, the adjusting portion 15 comes into contact with the protrusion 23 of the inner cover 2. In addition, the insect screen 61 is pressed by the first wall 161 of the adjusting portion 15, so that the insect screen 61 is fixed to the sensor 100. In addition, the tip of the light guide 73 is exposed to the outside of the sensor 100 through the light guide opening 16 (FIG. 7) of the outer cover 1. In this way, assembly of the sensor 100 illustrated in FIGS. 1 to 4 is completed.

(Fire Detection Operation)

Next, a fire detection operation by the sensor 100 will be described.

For example, the sensor 100 performs an operation of detecting a fire based on the amount of light received by the light receiving portion 72 or the temperature of the gas detected by the detection element 700. Since a known operation may be applied as this operation, only an outline will be described. In addition, since two detection elements 700 are provided in the sensor 100, a detection result of one of the two detection elements 700 detecting a higher temperature is used.

(Fire Detection Operation—when No Fire is Detected)

For example, when there is no fire in the monitoring area, no gas containing smoke particles flows into the detection space 300 of FIG. 28. Thus, there is no scattered light based on emission light emitted from the light emitting portion 71, and the light receiving portion 72 does not receive scattered light. In this case, the sensor 100 does not detect a fire.

In addition, since the gas having a relatively high temperature is not supplied to the detection element 700, the temperature detected by the detection element 700 is at a room temperature level. In this case, the sensor 100 does not detect a fire.

(Fire Detection Operation—when Fire is Detected)

On the other hand, for example, when a fire occurs in the monitoring area, gas containing smoke particles flows into the detection space 300 of FIG. 28. Therefore, the smoke particles are irradiated with light emitted from the light emitting portion 71 to generate a relatively large amount of scattered light, and the light receiving portion 72 receives the scattered light. In this case, the sensor 100 detects a fire. Note that details of the inflow of the gas into the sensor 100 will be described later.

In addition, for example, a relatively high-temperature gas is supplied to the detection elements 700, and the temperature detected by at least one of the two detection elements 700 rises to a predetermined level. In this case, the sensor 100 detects a fire.

Note that the fire detection operation described herein is an example and is not limited. More specifically, the following operation may be performed.

For example, a fire may be detected when the light receiving portion 72 receives a relatively large amount of light and the temperature detected by the detection element 700 rises to a predetermined level. Alternatively, a fire may be detected when the temperature detected by the detection element 700 rises to a predetermined level, regardless of a light reception result of the light receiving portion 72.

(Inflow of Gas)

Next, the inflow of gas into the sensor 100 will be described.

Figure 30:
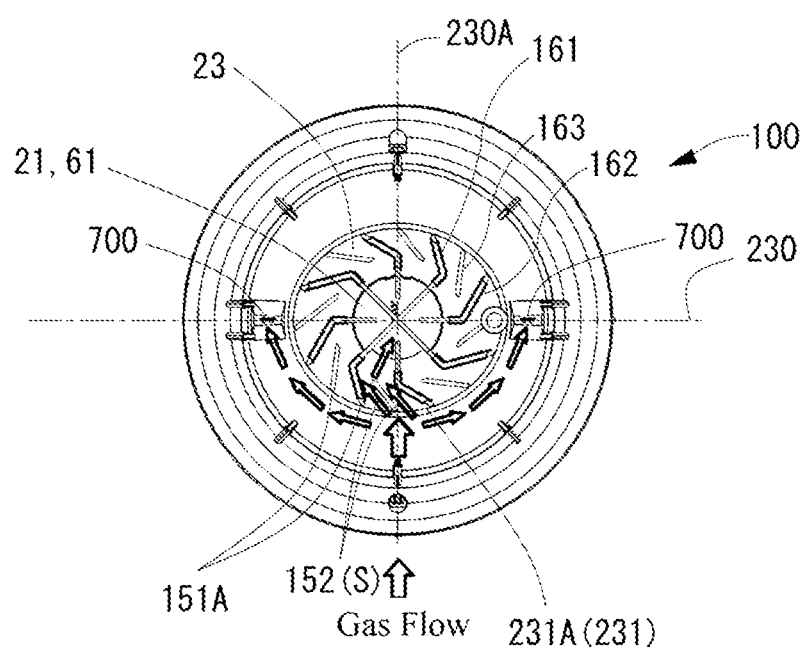
FIG. 30 is a diagram illustrating an inflow state of gas, and is a diagram illustrating an area corresponding to FIG. 29.
Figure 31:
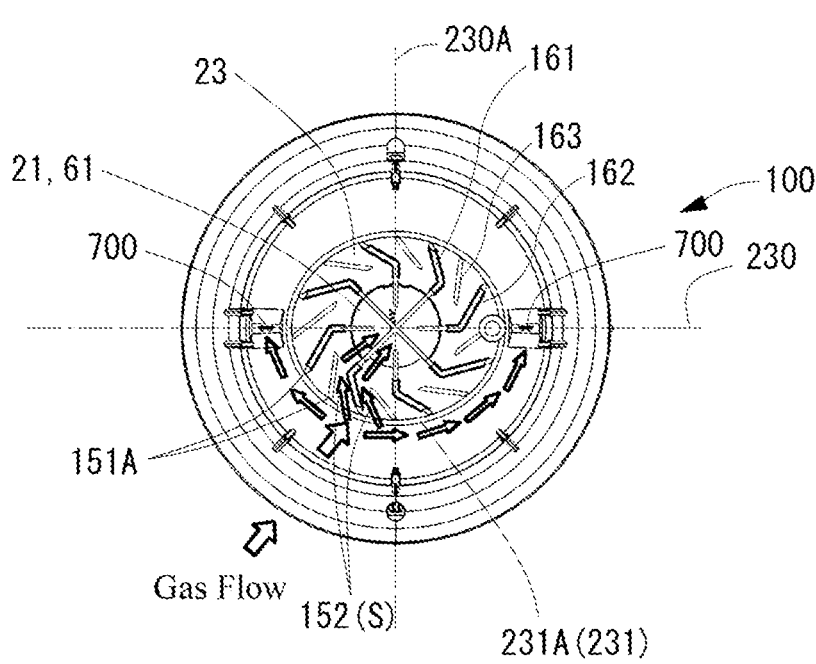
FIG. 31 is a diagram illustrating an inflow state of gas, and is a diagram illustrating an area corresponding to FIG. 29.

FIGS. 30 and 31 are diagrams illustrating an inflow state of gas, and are diagrams illustrating an area corresponding to FIG. 29. Note that in FIGS. 30 and 31, flows of gas are indicated by white arrows. FIG. 30 illustrates the case where the gas is supplied toward the inside of the sensor 100 from a direction corresponding to the minor axis 230A of the protrusion 23 (minor axis of an ellipse which is a circumferential shape of the outer peripheral wall 231A in a front view). FIG. 31 illustrates the case where the gas is supplied toward the inside of the sensor 100 from a direction shifted from the minor axis 230A of the protrusion 23 by a predetermined angle.

First, in FIG. 1, due to occurrence of the fire, gas containing smoke particles is supplied to the sensor 100 along the ceiling surface 900 and flows into the outer cover 1 through the inlet 14 of the outer cover 1.

Next, a part of the introduced gas is guided along the outer peripheral wall 231A (FIG. 29) of the stepped portion 231 and supplied to the detection element 700. Note that, in this case, a part of the gas is guided by the side end portion 151A of the plurality of walls 151 in the adjusting portion 15 disposed on the front side of the stepped portion 231 and supplied to the detection element 700.

Meanwhile, another part of the introduced gas climbs over the stepped portion 231 and is guided and supplied to the inside from the outer peripheral side of the sensor 100 through the gap 152 (FIG. 29) between the plurality of walls 151 of the adjusting portion 15. Thereafter, the other part of the gas flows into the detection space 300 through the first opening 21 of the inner cover 2 and the opening 31 of the smoke detector cover 3 while coming into contact with the first wall 161, the second wall 162, and/or the third wall 163 of the adjusting portion 15. In this case, even when the other part of the gas has a different flow velocity of the gas depending on the direction of inflow into the inflow space 400 (for example, when a flow velocity of gas illustrated in FIG. 30 is different from a flow velocity of gas illustrated in FIG. 31), smoke particles contained in the other part of the gas comes into contact with the first wall 161, the second wall 162, and/or the third wall 163 of the adjusting portion 15, so that a flow velocity of the smoke particles is adjusted to a desired velocity, and thus the smoke particles, the flow velocity of which is adjusted, flow into the detection space 300. In this way, it is possible to avoid variation in the flow velocity of the smoke particles flowing into the detection space 300, and it becomes easy to ensure detection accuracy of the smoke particles. Note that since the first opening 21 of the inner cover 2 is provided with the insect screen 61 (FIG. 6), the other part of the gas flows into the detection space 300 through the plurality of small holes (not illustrated) of the insect screen 61.

Here, as illustrated in FIG. 30, for example, when the other part of the gas is supplied toward the inside of the sensor 100 from a direction corresponding to the minor axis 230A, the other part of the gas is guided and supplied as indicated by white arrows of FIG. 30. In addition, as illustrated in FIG. 31, for example, when the other part of the gas is supplied toward the inside of the sensor 100 from a direction shifted from the minor axis 230A by a predetermined angle, the other part of the gas is guided and supplied as indicated by white arrows of FIG. 31.

Effect of Embodiment

As described above, according to the embodiment, since the inflow space 400 provided inside the sensor 100, the detection space 300 for detecting the detection target and provided at a position on the ceiling surface 900 side of the inflow space 400 on the inside of the sensor 100, the housing section for housing the detection space 300 and capable of allowing gas containing the detection target to flow into and out of the detection space 300 through the inflow space 400, and the adjusting portion 15 including the plurality of walls 151 provided in the inflow space 400 and used to adjust the flow velocity of the detection target flowing into the detection space 300 are provided, even when the flow velocity of the gas varies depending on the direction of inflow of the gas into the inflow space 400, it is possible to adjust the flow velocity of the detection target contained in the gas to a desired velocity. Therefore, it is possible to avoid variation in the flow velocity of the detection target flowing into the detection space 300, and it becomes easy to ensure detection accuracy of the detection target.

In addition, since the plurality of walls 151 is disposed to mutually have an interval therebetween so that a space partitioned by the plurality of walls 151 in the inflow space 400 has a labyrinth shape, the section can be formed in a labyrinth shape, and the flow velocity of the detection target flowing into the inflow space 400 can be effectively adjusted.

In addition, since at least some of the plurality of walls 151 is disposed in a radial shape toward the outside from the central portion of the inflow space 400, a plurality of spaces partitioned by the plurality of walls 151 can be formed in a radial shape, and thus even when the detection target flows into the inflow space 400 from various directions, the flow velocity of the detection target can be effectively adjusted.

In addition, since the plurality of walls 151 includes the first wall 161 in which at least some of the plurality of walls 151 intersect in a substantially cross shape at least in the central portion of the inflow space 400, it is possible to ensure the flow path for allowing the detection target to flow into the detection space 300 from the outside of the sensor 100 in the inflow space 400, and to enhance stability when the adjusting portion is attached. In addition, it is possible to suppress permeation of moisture (for example, steam, etc.) in the central portion of the inflow space 400, and to enhance a moisture permeation prevention property.

In addition, since the plurality of inlets 14 and the plurality of walls 151 are configured so that a relative arrangement relationship between an inlet 14 and a wall 151 corresponding to the inlet 14 is the same for the plurality of inlets 14, the inflow of gas at each inlet 14 can be made uniform. Therefore, it is possible to suppress variation in the amount of gas flowing into each inlet 14, and it becomes easier to ensure detection accuracy of the detection target.

In addition, since the installation number of walls 151 is set to be an integral multiple of the installation number of inlets 14, the installation number and an arrangement interval of the walls 151 disposed corresponding to each inlet 14 can be easily made uniform, and thus it becomes easy to make the inflow of gas at each inlet 14 uniform.

In addition, since the length of the gap between the adjacent walls 151 among the plurality of walls 151 is made substantially uniform, and the length of the width of each of the plurality of inlets 14 is made substantially uniform, the installation number and the arrangement interval of the walls 151 disposed corresponding to each inlet 14 can be easily made uniform, and thus it becomes easier to make the inflow of gas at each inlet 14 uniform.

In addition, since the adjusting portion 15 is formed integrally with the housing section, when compared to the case where the adjusting portion 15 is formed separately from the housing section, it is possible to omit the trouble of attaching the adjusting portion 15 to the housing section, and to enhance an attaching property of the adjusting portion 15. In addition, since the heat capacity of the adjusting portion 15 can be increased, it is possible to improve the moisture permeation prevention property.

[Modifications to Embodiment]

Even though the embodiment according to the invention has been described above, the specific configuration and units of the invention may be modified and improved in any manner within the scope of the technical ideas of each invention described in the claims. Such modifications will be described below.

(With Regard to Problem to be Solved and Effect of Invention)

First, the problem to be solved by the invention and the effect of the invention are not limited to the above-described content, and the invention may solve a problem not described above or achieve an effect not described above. In addition, the invention may solve a part of the problem described above or achieve a part of the effect described above.

(With Regard to Sensor)

In the embodiment, the sensor 100 has been described as including the detection element 700 and the second opening 22. However, the invention is not limited thereto. For example, the detection element 700 and the second opening 22 may be omitted.

(With Regard to Housing Section)

In the embodiment, a description has been given on the assumption that the housing section includes the outer cover 1 and the inner cover 2. However, the invention is not limited thereto. For example, the inner cover 2 may be omitted. In this case, the adjusting portion 15 may be formed integrally with the top surface portion 12 (or the main body 11) of the outer cover 1. Alternatively, the adjusting portion 15 may be formed separately from the outer cover 1 (however, the plurality of walls 151 may be continuously formed), and the adjusting portion 15 may be provided to be fit to a groove provided on the top surface portion 12.

(With Regard to Adjusting Portion)

In the embodiment, the case where the adjusting portion 15 of FIG. 8 is provided on the outer cover 1 has been described. However, the invention is not limited thereto. For example, the adjusting portion 15 may be provided on the inner cover 2. Specifically, the adjusting portion 15 may be formed integrally with the inner cover 2, or the separately formed adjusting portion 15 may be fixed to the inner cover 2 using an adhesive, etc.

In addition, in the embodiment, the adjusting portion 15 has been described as being formed integrally with the top surface portion 12 of the outer cover 1. However, the invention is not limited thereto. For example, at least part of the adjusting portion 15 may be formed integrally with the main body 11 of the outer cover 1.

Further, in the embodiment, the adjusting portion 15 has been described as including the first wall 161, the second wall 162, and the third wall 163. However, the invention is not limited thereto. For example, the adjusting portion 15 may have only one or two of the first wall 161, the second wall 162, or the third wall 163.

Further, in the embodiment, each of the first intersection wall 161a, the second intersection wall 161b, the third intersection wall 161c, and the fourth intersection wall 161d of the first wall 161 has been described as being formed to have the substantially curved shape in the front view. However, the invention is not limited thereto. For example, at least some of the first intersection wall 161a, the second intersection wall 161b, the third intersection wall 161c, and the fourth intersection wall 161d of the first wall 161 may be formed to have a linear shape in the front view.

Further, in the embodiment, the second wall 162 has been described as being formed to have the substantially curved shape in the front view. However, the invention is not limited thereto. For example, the second wall 162 may be formed to have a linear shape in the front view.

Further, in the embodiment, at least some of the plurality of walls 151 have been described as being disposed in the radial shape from the central portion of the inflow space 400 toward the outside. However, the invention is not limited thereto. For example, all the plurality of walls 151 may be disposed in the radial shape from the central portion of the inflow space 400 toward the outside. Alternatively, all the plurality of walls 151 may be disposed in a non-radial shape from the central portion of the inflow space 400 toward the outside (for example, all the plurality of walls 151 may be arranged in parallel to mutually have an interval therebetween in a direction along the X-axis (or Y-axis)).

Further, in the embodiment, the plurality of inlets 14 and the plurality of walls 151 have been described as being configured so that a relative arrangement relationship between an inlet 14 and a wall 151 corresponding to the inlet 14 is the same for the plurality of inlets 14. However, the invention is not limited thereto. For example, the plurality of inlets 14 and the plurality of walls 151 may be configured so that the relative arrangement relationship is different for the plurality of inlets 14. In this case, for example, the installation number of walls 151 may be set so as not to be an integral multiple of the installation number of inlets 14. In addition, the length of the gap between adjacent walls 151 among the plurality of walls 151 may be set to be non-uniform, and/or the length of the width of each of the plurality of inlets 14 may be set to be non-uniform.

(With Regard to Top Surface Portion)

In the embodiment, the top surface portion 12 has been described as being formed of a substantially circular flat plate-shaped body and provided substantially horizontally. However, the invention is not limited thereto. For example, at least a part of the top surface portion 12 may be formed in an inclined shape so that, when water droplets generated by the adjusting portion 15 condensing moisture adhere to the top surface portion 12, the water droplets can flow down from the top surface portion 12.

As an example, the entire top surface portion 12 may be formed of a substantially circular flat plate-shaped body, and the top surface portion 12 may be provided so as to be inclined with respect to the horizontal direction. Alternatively, only a part of the top surface portion 12 (for example, a portion other than an outer edge of the top surface portion 12 and the vicinity thereof) may be formed in an inclined shape, and the top surface portion 12 may be provided substantially horizontally.

In this way, it is possible to suppress accumulation of the water droplets on the top surface portion 12, and to avoid impairment of the function of the sensor 100 due to the water droplets.

(With Regard to Outer Peripheral Wall)

In the embodiment, a description has been given of the case where the outer peripheral wall 231A has an elliptical circumferential shape in the front view, that is, the protrusion 23 has the elliptical shape in the front view. However, the invention is not limited thereto. For example, the outer peripheral wall 231A may be configured so that the peripheral shape is an oval other than a perfect circle in the front view. When this configuration is adopted as well, it is possible to suppress variation in the temperature of the gas detected by the detection element 700 based on the direction in which the gas is supplied.

(With Regard to Combination)

The features of the embodiment and the features of the modifications may be combined in any manner.

One embodiment of the present invention provides a fire detection apparatus attached to a predetermined installation surface to detect a fire in a monitoring area, the fire detection apparatus comprises: an inflow space provided inside the fire detection apparatus, gas outside the fire detection apparatus being allowed to flow into the inflow space; a detection space for detecting a detection target, the detection space being provided at a position on an installation surface side of the inflow space on the inside of the fire detection apparatus; a housing section for housing the detection space, the housing section being capable of allowing the gas containing the detection target to flow into and out of the detection space through the inflow space; and an adjusting section including a plurality of walls provided in the inflow space, the adjusting section being used to adjust a flow velocity of the detection target flowing into the detection space.

According to this embodiment, since the inflow space provided inside the fire detection apparatus, the detection space for detecting a detection target and provided at a position on an installation surface side of the inflow space on the inside of the fire detection apparatus, the housing section for housing the detection space and capable of allowing the gas containing the detection target to flow into and out of the detection space through the inflow space; and an adjusting section including a plurality of walls provided in the inflow space and used to adjust a flow velocity of the detection target flowing into the detection space are provided, even when the flow velocity of the gas varies depending on the direction of inflow of the gas into the inflow space, it is possible to adjust the flow velocity of the detection target contained in the gas to a desired velocity. Therefore, it is possible to avoid variation in the flow velocity of the detection target flowing into the detection space, and it becomes easy to ensure detection accuracy of the detection target.

Another embodiment of the present invention provides the fire detection apparatus according to the above embodiment, wherein the plurality of walls is disposed to mutually have an interval therebetween so that a space partitioned by the plurality of walls in the inflow space has a labyrinth shape.

According to this embodiment, since the plurality of walls is disposed to mutually have an interval therebetween so that a space partitioned by the plurality of walls in the inflow space has a labyrinth shape, the section can be formed in a labyrinth shape, and the flow velocity of the detection target flowing into the inflow space can be effectively adjusted.

Another embodiment of the present invention provides the fire detection apparatus according to the above embodiment, wherein at least some of the plurality of walls are disposed in a radial shape toward an outside from a central portion of the inflow space.

According to this embodiment, since at least some of the plurality of walls are disposed in a radial shape toward an outside from a central portion of the inflow space, a plurality of spaces partitioned by the plurality of walls can be formed in a radial shape, and thus even when the detection target flows into the inflow space from various directions, the flow velocity of the detection target can be effectively adjusted.

Another embodiment of the present invention provides the fire detection apparatus according to the above embodiment, wherein the plurality of walls includes an intersection wall in which at least some of the plurality of walls intersect in a substantially cross shape at least in a central portion of the inflow space.

According to this embodiment, since the plurality of walls includes an intersection wall in which at least some of the plurality of walls intersect in a substantially cross shape at least in a central portion of the inflow space, it is possible to ensure the flow path for allowing the detection target to flow into the detection space from the outside of the fire detection apparatus in the inflow space, and to enhance stability when the adjusting section is attached. In addition, it is possible to suppress permeation of moisture (for example, steam, etc.) in the central portion of the inflow space, and to enhance a moisture permeation prevention property.

Another embodiment of the present invention provides the fire detection apparatus according to the above embodiment, wherein: the housing section includes a plurality of inlets for allowing the gas to flow into the inflow space; and the plurality of inlets and the plurality of walls are configured so that a relative arrangement relationship between the inlets and the walls corresponding to the inlets is the same for the plurality of inlets.

According to this embodiment, since the plurality of inlets and the plurality of walls are configured so that a relative arrangement relationship between the inlets and the walls corresponding to the inlets is the same for the plurality of inlets, the inflow of gas at each inlet can be made uniform. Therefore, it is possible to suppress variation in the amount of gas flowing into each inlet, and it becomes easier to ensure detection accuracy of the detection target.

Another embodiment of the present invention provides the fire detection apparatus according to the above embodiment, wherein an installation number of the walls is an integer multiple of an installation number of the inlets.

According to this embodiment, since an installation number of the walls is an integer multiple of an installation number of the inlets, the installation number and an arrangement interval of the walls disposed corresponding to each inlet can be easily made uniform, and thus it becomes easy to make the inflow of gas at each inlet uniform.

Another embodiment of the present invention provides the fire detection apparatus according to the above embodiment, wherein a length of a gap between adjacent walls among the plurality of walls is made substantially uniform, and/or a length of a width of each of the plurality of inlets is made substantially uniform.

According to this embodiment, since a length of a gap between adjacent walls among the plurality of walls is made substantially uniform, and/or a length of a width of each of the plurality of inlets is made substantially uniform, the installation number and the arrangement interval of the walls disposed corresponding to each inlet can be easily made uniform, and thus it becomes easier to make the inflow of gas at each inlet uniform.

Another embodiment of the present invention provides the fire detection apparatus according to the above embodiment, wherein the adjusting section is formed integrally with the housing section.

According to this embodiment, since the adjusting section is formed integrally with the housing section, when compared to the case where the adjusting section is formed separately from the housing section, it is possible to omit the trouble of attaching the adjusting section to the housing section, and to enhance an attaching property of the adjusting section. In addition, since the heat capacity of the adjusting section can be increased, it is possible to improve the moisture permeation prevention property.

REFERENCE SIGNS LIST

1 Outer cover
2 Inner cover
3 Smoke detector cover
5 Smoke detector base
11 Main body
12 Top surface portion
13 Connecting portion
14 Inlet
15 Adjusting portion
16 Light guide opening
21 First opening
22 Second opening
23 Protrusion
24 Light guide opening
31 Opening 32 Light emitting-side housing
33 Light receiving-side housing
51 Light emitting-side housing
52 Light receiving-side housing
61 Insect screen
62 Board
63 Terminal board
64 Engaging metal fitting
71 Light emitting portion
72 Light receiving portion
73 Light guide
100 Sensor
151 Wall
151A Side end portion
152 Gap
161 First wall
161a First intersection wall
161b Second intersection wall
161c Third intersection wall
161d Fourth intersection wall
162 Second wall
163 Third wall
200 Base portion
230 Major axis
230A Minor axis
231 Stepped portion
231A Outer peripheral wall
300 Detection space
400 Inflow space
700 Detection element
711 Light emitting element
712 Light emitting-side optical element
721 Light receiving element
722 Light receiving-side optical element
801 Reference line
802 Reference line
803 Reference line
804 Reference line
805 Reference line
806 Reference line
807 Reference line
808 Reference line
809 Reference line
810 Reference line
811 Reference line
812 Reference line
813 Reference line
814 Reference line
815 Reference line
816 Reference line
817 Reference line
818 Reference line
819 Reference line
900 Ceiling surface
901 Optical axis
902 Optical axis
S Space
S1 Space
S2 Space

The invention claimed is:

1. A fire detection apparatus attached to a predetermined installation surface to detect a fire in a monitoring area, the fire detection apparatus comprising:

an inflow space provided inside the fire detection apparatus, a gas outside the fire detection apparatus being allowed to flow into the inflow space;

a detection space for detecting a detection target, the detection space being provided at a position inside of an installation surface side of the inflow space;

a housing section for housing the detection space, the housing section being capable of allowing the gas containing the detection target to flow into and out of the detection space through the inflow space; and a heat detection element for detecting heat of gas flowing into the inflow space, wherein the housing section includes an outer cover and an inner cover, wherein the outer cover houses the inner cover, the outer cover includes a main body that is formed in a hollow shape, a top surface portion that is provided substantially horizontally at a position on an opposite side from the installation surface side with respect to the main body and the inflow space, an inlet for allowing gas to flow into the fire detection apparatus and allowing the gas to flow out from the inside of the fire detection apparatus, the inlet being formed in a gap between the main body and the top surface portion, and an adjusting section including a plurality of walls provided in the inflow space, the adjusting section being used to adjust a flow velocity of the detection target flowing into the detection space, wherein the inner cover houses a base portion and the detection space, the inner cover includes a first opening that is an opening for allowing gas to flow into the detection space and allowing the gas to flow out from the inside of the detection space, and a protrusion that protrudes from the base portion toward the opposite side of the installation surface, wherein the inflow space is provided in a space between the top surface portion and the inner cover in an inner space of the outer cover, wherein the plurality of walls of the adjusting section is disposed to mutually have an interval therebetween so that a space partitioned by the plurality of walls in the inflow space has a labyrinth shape that is a shape in which an outer end portion to an inner end portion of the space partitioned by the plurality of walls cannot be connected by a straight line, the plurality of walls being formed integrally with the top surface portion of the outer cover and being provided to protrude from the top surface portion toward the installation surface to come into contact with the protrusion, wherein the inflow space, the detection space, and the housing section are configured to allow gas to flow into the outer cover through the inlet of the outer cover, and a part of the gas can flow into the detection space through the gap between the plurality of walls of the adjusting section in the inflow space and then through the first opening of the inner cover, wherein the protrusion of the inner cover has an elliptical shape in a front view and a stepped portion that protrudes and rises with respect to the base portion, wherein the heat detection element is disposed at each of positions that are along extension of a major axis of the elliptical shape of the protrusion of the inner cover and that are positions of right side and left side of the stepped portion in a front view, wherein the plurality of walls is disposed to come into contact with the protrusion, and wherein the plurality of walls is disposed so that respective outer end portions of at least one of the plurality of walls is located at an outer edge of the stepped portion or in vicinity thereof or at a side end portion of at least one of the plurality of walls extends along outer periphery of the stepped portion.

2. The fire detection apparatus according to claim 1, wherein at least some of the plurality of walls are disposed in a radial shape toward an outside from a central portion of the inflow space.

3. The fire detection apparatus according to claim 1, wherein the plurality of walls includes an intersection wall in which at least some of the plurality of walls intersect in a substantially cross shape at least in a central portion of the inflow space.

4. The fire detection apparatus according to claim 1, wherein:

the housing section includes a plurality of inlets for allowing the gas to flow into the inflow space; and the plurality of inlets and the plurality of walls are configured so that a relative arrangement relationship between the inlets and the walls corresponding to the inlets is the same for the plurality of inlets.

5. The fire detection apparatus according to claim 4, wherein an installation number of the walls is an integer multiple of an installation number of the inlets.

6. The fire detection apparatus according to claim 5, wherein a length of a gap between adjacent walls among the plurality of walls is made substantially uniform, and/or a length of a width of each of the plurality of inlets is made substantially uniform.

* * * * *